United States Patent
Suzuki et al.

[11] Patent Number: 5,950,021
[45] Date of Patent: *Sep. 7, 1999

[54] CAMERA WITH ZOOM LENS

[75] Inventors: Ryoichi Suzuki, Yokohama; Harushige Yamamoto, Yamato, both of Japan

[73] Assignee: Canon Kabushiki Kaisha, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/111,396

[22] Filed: Aug. 25, 1993

Related U.S. Application Data

[63] Continuation of application No. 07/831,992, Feb. 6, 1992, abandoned.

[30] Foreign Application Priority Data

Feb. 7, 1991 [JP] Japan ................................ 3-016383
Feb. 13, 1991 [JP] Japan ................................ 3-020136

[51] Int. Cl.$^6$ .................................................. G03B 1/18
[52] U.S. Cl. .............................................. 396/87; 396/75
[58] Field of Search ...................... 354/195.1, 195.11, 354/195.12, 400, 408; 74/339, 342; 396/72, 75, 83, 131, 133, 85, 86, 87

[56] References Cited

U.S. PATENT DOCUMENTS

| | | | |
|---|---|---|---|
| 3,889,282 | 6/1975 | Hashimoto | 354/195.1 |
| 4,643,037 | 2/1987 | Kis | 74/342 |
| 4,726,260 | 2/1988 | Lovrenich | 74/861 |
| 4,865,432 | 9/1989 | Aoyagi et al. | 350/429 |
| 4,885,600 | 12/1989 | Iwasa et al. | 354/400 |
| 5,115,348 | 5/1992 | Notagashira | 359/697 |
| 5,166,716 | 11/1992 | Kawano | 354/195.1 |
| 5,202,717 | 4/1993 | Ookubo et al. | 354/400 |
| 5,223,981 | 6/1993 | Kaneda | 354/400 |
| 5,231,441 | 7/1993 | Hata | 354/400 |
| 5,245,476 | 9/1993 | Shono | 359/699 |
| 5,249,010 | 9/1993 | Kaneda | 354/400 |
| 5,250,976 | 10/1993 | Shiokama et al. | 354/400 |
| 5,264,888 | 11/1993 | Inoue et al. | 354/400 |

FOREIGN PATENT DOCUMENTS

| | | | |
|---|---|---|---|
| 63-141029 | 6/1988 | Japan | 354/195.1 |
| 3-180826 | 8/1991 | Japan . | |

OTHER PUBLICATIONS

Photographing Industry, Camera Test, published Jun., 1988 (with English translation).

*Primary Examiner*—Safet Metjahic
*Assistant Examiner*—Michael Dalakis
*Attorney, Agent, or Firm*—Fitzpatrick, Cella, Harper & Scinto

[57] ABSTRACT

A camera with a collapsible barrel zoom lens has a lens barrel collapsing drive mechanism for putting out a lens barrel including a zoom operation member for operating a plurality of lenses for zooming by controlling the positions of the lenses from a collapsed position to a photographing waiting position in front of the camera body, a bayonet member for positioning and retaining the lens barrel on the camera body, the bayonet member being mounted on the camera body so as to be rotatable about an optical axis, a zoom driving force transmission mechanism for transmitting a zoom driving force to the zoom operation member by connecting an input gear for transmitting a driving force to the zoom operation member provided on the lens barrel and an output gear provided on the camera body, an input gear rotation inhibition member capable of engaging with the input gear while the input gear is moved to a position immediately before the position at which is connected to the output gear, the input gear rotating inhibition member being provided on the camera body, and a lock member for positioning and retaining the lens barrel in the photographing waiting position and for releasing the lens barrel from the positioned and retained state, the lock member being engaged/disengaged with the output gear by an operation of rotating the bayonet member to inhibit/allow the rotation of the output gear.

150 Claims, 19 Drawing Sheets

CAMERA WITH ZOOM LENS

This application is a continuation of application Ser. No. 07/831,992 filed Feb. 6, 1992; now abandoned.

BACKGROUND OF THE INVENTION

1. Field of the Invention

This invention relates to a camera having a type of zoom lens in which a lens barrel can be collapsed in a camera body.

2. Description of the Related Art

Non-lens-interchangable type compact cameras having a zoom lens mechanism have recently been placed on the market. For example, a camera of this type, such as that shown in FIG. 11, is known.

In the camera shown in FIG. 11, the positions of fore and rear groups of a photographing optical system are controlled with one cam ring 201 and a straight-drive cam 202 to position the two lens groups at focal distances which change continuously. A gear 201a is formed on a rear outer-circumferential portion of the cam ring 201. The gear 201a is driven with a gear 203 to which a driving force is transmitted from a power source to perform zooming.

In the arrangement shown in FIG. 11, the whole lens barrel including the cam ring 201 and the straight-drive cam 202 can be collapsed in the body by an operation using a retraction cam ring 205 and a retraction straight-drive cam 204 slidably engaging with a pin 204' embedded in the straight-drive cam 202.

The conventional zooming mechanism shown in FIG. 11 entails the following problems.

(a) To prevent the outer circumferential gear portion 201a provided on the cam ring 201 from interfering with an inner circumferential portion of the straight-drive cam 204 when the lens barrel is collapsed, it is necessary to increase the diameters of the cam 204 and the cam ring 205. However, the overall size of the camera is increased if the cam 204 and the cam ring 205 are increased.

(b) To maintain the engagement between the gear 203 and the gear 201a while the lens barrel is retracted, it is necessary to extend the gear portion 201a of the cam ring 201 as indicated at 201b. However, if such an extended gear portion 201b is provided, it must be covered with an outer casing portion of the camera so that it is not exposed outside the camera even when put out from the collapsed position, resulting in an increase in the outside diameter of the lens barrel cover.

(c) If the cam ring 201 is exposed outside when the lens barrel is put out from the collapsed position, the cam ring 201 having the rotating cam groove can be seen from the outside so that the appearance of the camera is marred and, moreover, there is a risk of a light leak through the cam groove. To prevent this risk, it is necessary to form an outer casing 206 so as to cover the cam ring 201 and the straight-drive cam 202. This design has a contrary effect; the thickness of the camera is increased in comparison with conventional cameras, although the lens barrel unit can be collapsed in the camera body.

The applicant of the present invention has proposed a camera disclosed in Japanese Patent Application No. 1-320130 (now, Japanese Laid-Open Patent No. 3-180826) to solve this problem.

The zoom lens barrel of this camera is generally constituted of three lens groups. The positions of the first and second lens groups are controlled by the rotation of a cam ring, and the third lens group is driven by another driving mechanism. These three lens groups are operated for zooming, and the third lens group is used as a focusing lens. An input gear formed of a gear train meshing with an internal teeth formed on an inner circumferential surface of a rear end portion of the cam ring and an output gear of the zoom driving mechanism provided on the camera body are connected at a lens barrel put-out position to transmit a zoom driving force to the cam ring.

However, the input gear and the output gear constituting the zoom driving mechanism are disconnected when the lens barrel is retracted into the camera body, and there is a possibility of these gears rotating relative to each other to be out of phase when the camera is carried so that the gears cannot be connected smoothly when the lens is put out for photographing.

There is also a problem that a diverging torque from the output gear cannot be used to drive a zoom finder. This is because if the input and output gears become out of phase, the phase of a cam for making a torque diverge from the output gear to drive a lens of the finder by a well-known means is shifted.

SUMMARY OF THE INVENTION

An object of the present invention is to provide a camera with a zoom lens free from the above-described problems.

To achieve this object, according to one aspect of the present invention, there is provided a camera comprising a lens barrel collapsing drive mechanism for putting out a lens barrel including a zoom operation member for operating a plurality of lenses for zooming by controlling the positions of the lenses from a collapsed position to a photographing waiting position in front of the camera body, a bayonet member for positioning and retaining the lens barrel on the camera body, the bayonet member being mounted on the camera body so as to be rotatable on an optical axis, a zoom driving force transmission mechanism for transmitting a zoom driving force to the zoom operation member by connecting an input gear for transmitting a driving force to the zoom operation member provided on the lens barrel and an output gear provided on the camera body, an input gear rotation inhibition member capable of engaging with the input gear while the input gear is moved to a position immediately before the position at which is connected to the output gear, the input gear rotation inhibition member being provided on the camera body, and a lock member for positioning and retaining the lens barrel in the photographing waiting position and for releasing the lens barrel from the positioned and retained state, the lock member being engaged/disengaged with the output gear by an operation of rotating the bayonet member to inhibit/allow the rotation of the output gear.

BRIEF DESCRIPTION OF THE DRAWINGS

FIG. 12 is an exploded perspective view of the lens barrel of the camera of the second embodiment;

FIG. 13 is a front view of the stepping motor for driving the third group lenses shown in FIG. 12;

FIG. 14 is a cross-sectional view of the lens barrel shown in FIG. 12;

FIG. 15 is a schematic diagram of a lens position detecting apparatus;

FIG. 16 is a plan view of a slit plate;

FIG. 17 is a cross-sectional view of the camera shown in FIG. 12;

FIG. 18 is a diagram of a relationship between the bayonet ring and the first group cam ring shown in FIG. 12;

FIG. 19 is a diagram of a relationship between the bayonet ring and the first group cam ring shown in FIG. 12;

FIG. 20 is a diagram showing a zooming power connection state;

FIG. 21 is a diagram showing another zooming power connection state;

FIG. 22 is a cross-sectional view of the lens barrel shown in FIG. 12;

FIG. 23 is a cross-sectional view of the lens barrel shown in FIG. 12;

FIG. 24 is a diagram of a waveform output from the lens position detecting apparatus;

FIG. 25 is a diagram of a waveform output from the lens position detecting apparatus;

FIG. 26 is a waveform diagram of an output from a comparator circuit by comparing information from the lens position detecting apparatus;

FIG. 27 is a diagram of a backlash of gears;

FIG. 28 is a diagram of a positional relationship between zoom positions and the lenses;

FIG. 29 is a diagram between the extent in which the third group lenses are put out and the distance to a subject;

FIG. 30 is a block diagram of a lens position controller;

FIG. 31 is a flowchart of lens position control operation;

DESCRIPTION OF THE PREFERRED EMBODIMENTS

FIGS. 1 to 10 show a first embodiment of the present invention.

Figure 3:
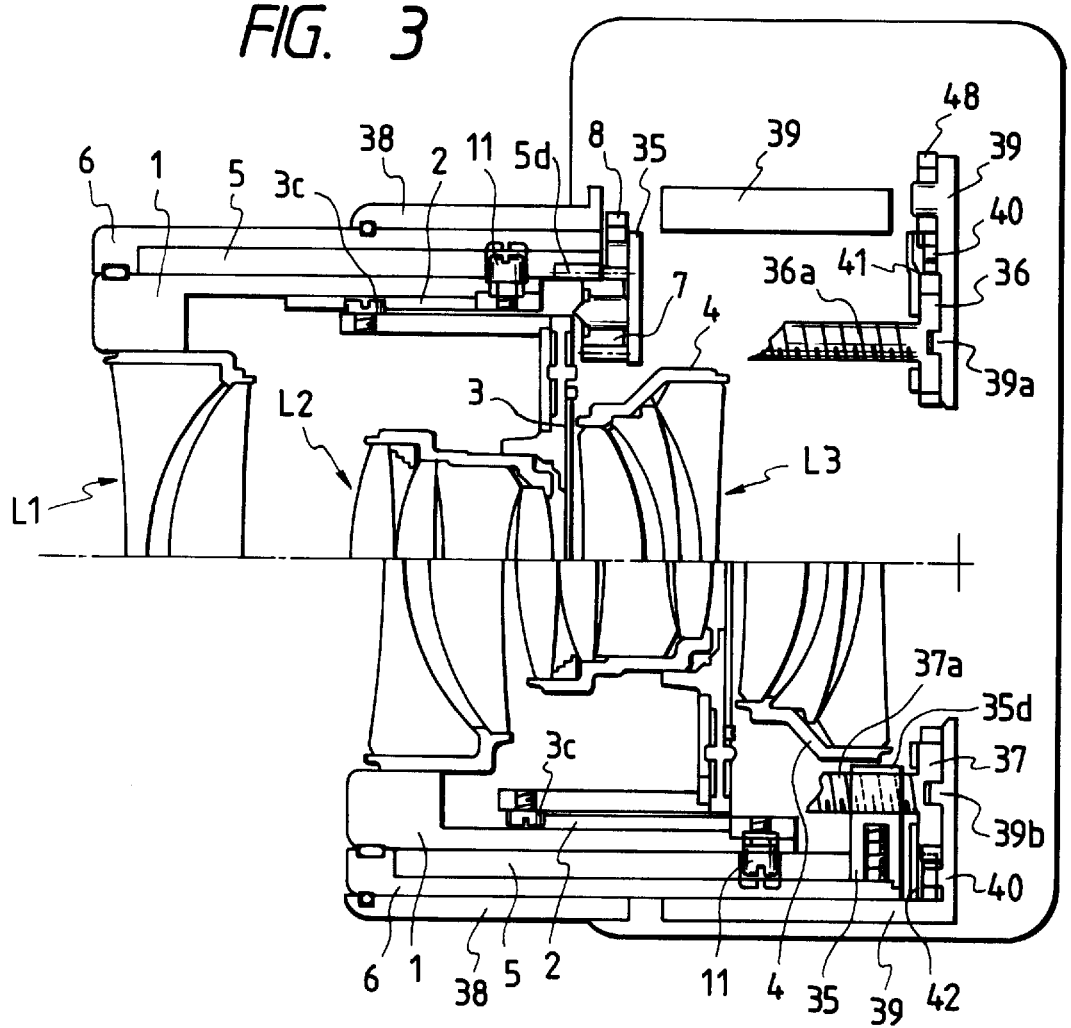
FIG. 3 is a cross-sectional view of the camera shown in FIG. 1.

A zoom lens mounted on a camera in accordance with this embodiment is a three-group lens, such as that shown in FIG. 3, having a first group lens $L_1$, second group lenses $L_2$ and third group lenses $L_3$. A rear-focus system is adopted in which the first group lens $L_1$, the second group lenses $L_2$ and the third group lenses $L_3$ are operated for zooming while the third group lenses $L_3$ are operated for focusing. Zooming and focusing operations are performed by motor driving. This zoom lens is also arranged as a retraction type such that these lens groups are collapsed in a camera body 39 when not used for photographing.

Figure 1:
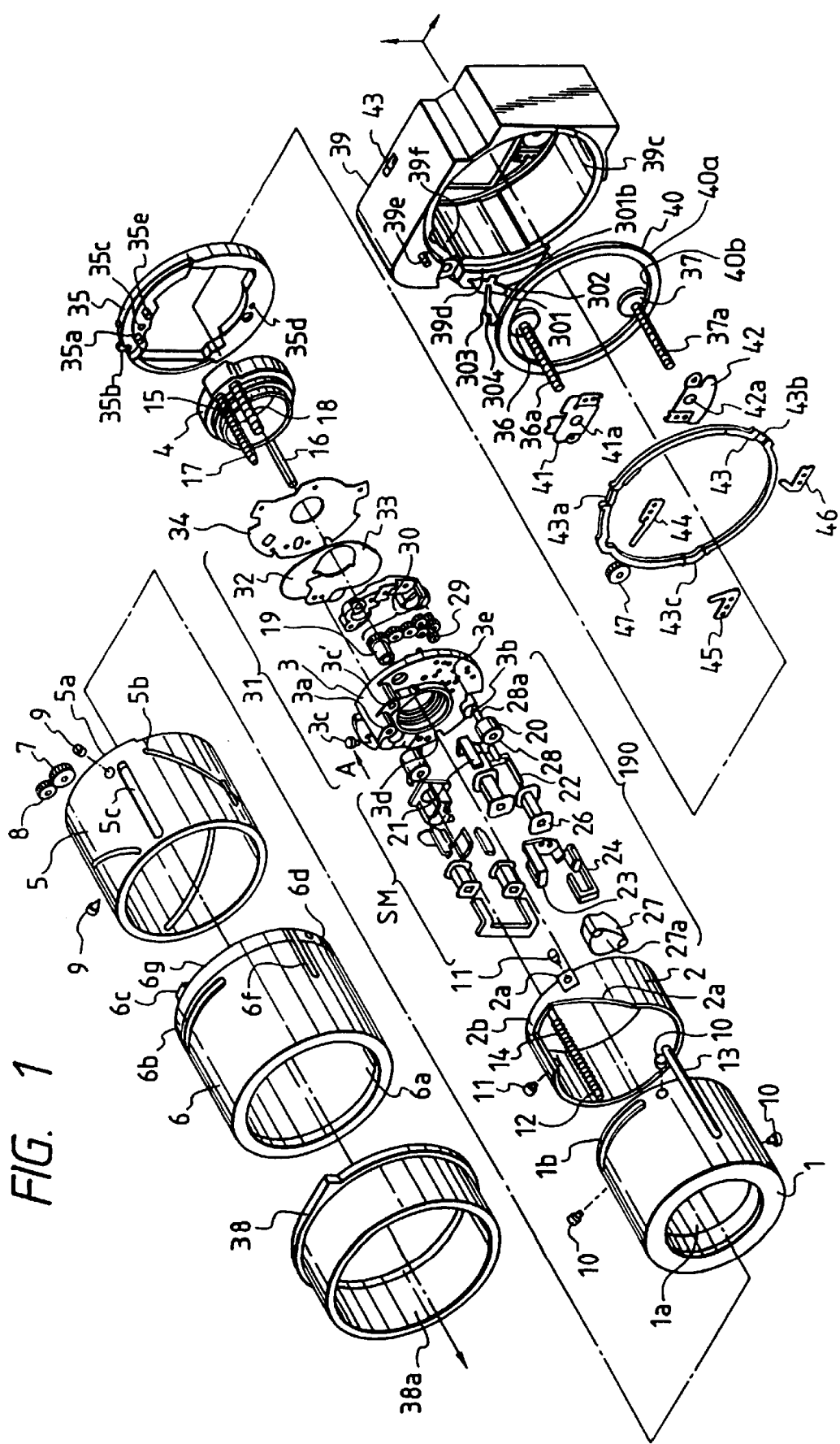
FIG. 1 is an exploded perspective view of a camera with a zoom lens in accordance with a first embodiment of the present invention.

Referring to FIG. 1, an exploded perspective view of portions of the camera, the zoom lens also has a first group lens barrel 1 having an end portion 1a on which the first group lens is supported, a second group lens cam ring 2 rotatably fitted on an inner circumferential surface of the lens barrel 1, a shutter ground plate 3 on which the second group lenses are supported and on which a well-known type of shutter unit is also supported, a third group holder 4 on which the third group lenses are supported, a first group cam ring 5 for determining the position of the first group lens barrel (first group lens) in the direction along the photographing optical axis, and a straight-drive guide 6 relatively rotatably fitted on an outer circumferential surface of the first group cam ring 5 and having an axial groove 6a formed in its inner circumferential surface to make the first group lens barrel 1 move straight in the direction along the photographing optical axis alone.

An unillustrated internal gear is attached to an inner circumferential surface of a rear end portion 5a of the first group cam ring 5. This internal gear meshes with a gear 7 which meshes a gear 8. The gear 8 meshes with a gear 50 which is supported axially rotatably on a support shaft 39e of the camera body 39. The gears 7 and 8 are respectively supported axially rotatably on fixing shafts 35a and 35b of a gear carrier plate 35 described later. A driving force is applied from an unillustrated zooming motor to the gear 8 through a gear 50 when the gear 8 meshes with a gear 50 (when the lens barrel is put out), and is transmitted to the first group cam ring 5 while rotating the gear 8.

The first group cam ring 5 is supported on the inner circumferential surface of the straight-drive guide 6 so as to be rotatable on the optical axis, but it cannot move in the direction along the optical axis because a pin 9 embedded in the outer circumferential surface of the ring 5 is inserted in a circumferential groove 6b of the straight-drive guide 6.

A pin 10 is embedded in an outer circumferential surface of the first group lens barrel 1. The pin 10 is relatively slidably inserted in a cam groove 5b formed in the cam ring 5 as well as in the axial groove 6a of the straight-drive guide 6. The position of the first group lens barrel 1 in the direction along the optical axis is therefore controlled through the cam groove 5b.

When the gear 8 starts rotating by receiving the power from the drive source, the gear 7 rotates to transmit its torque to the internal gear of the cam ring 5, and the cam ring 5 thereby starts rotating. As the cam ring 5 rotates, the first group lens barrel 1 is driven in the direction along the optical axis to an extent corresponding to the displacement of the cam groove 5b in the same direction, because the pin 10 embedded in the first group lens barrel 1 is relatively slidable in the cam groove 5b and the axial groove 6a. The first group lens barrel 1 is thereby moved for zooming.

The second group lens zooming mechanism and the zooming operation of this mechanism will next be described below. The second group lens cam ring 2 is rotatably supported on an inner circumferential surface of the first lens barrel 1. A pin 11 embedded in a rear end portion 2a of the cam ring 2 is relatively slidably inserted in a circumferential groove 1b formed in the first group lens barrel 1 and in a groove 5c which is formed in the cam ring 5 so as to extend in the direction along the optical axis.

When the cam ring 5 starts rotating to move the first group lens barrel 1 along the optical axis, the second group lens cam ring 2 is moved along the optical axis integrally with the first group lens barrel 1, since its movement in the direction along the optical axis is stopped by the circumferential groove 1b of the first group lens barrel 1 engaging with its embedded pin 11. Also, as the cam ring 5 rotates, the second group lens cam ring 2 moves in the direction along the optical axis integrally with the first group lens barrel 1 and simultaneously rotates through the same angle as the rotation of the cam ring 5, since the embedded pin 11 is stopped from moving relative to the cam ring 5 in the direction of the rotation thereof by the groove 5c of the cam ring 5.

The first group lens barrel 1 has a pair of guide bars 12 and 13 fixed to its internal portions and extending parallel to the optical axis. The guide bar 12 is slidably inserted into a hole 3a of the shutter ground plate 3, and a compression spring 14 fitted around the guide bar 12 urges the shutter ground plate 3 rearward (rightward as viewed in FIG. 1) and parallel to the optical axis. The other guide bar 13 is fitted in a cutout 3b formed in an outer circumferential portion of the shutter ground plate 3 to prevent the ground plate 3 from rotating on the guide bar 12. Therefore the ground plate 3 can only move parallel to the optical axis.

The shutter ground plate 3, shutter blades 32 and 33, a blade retaining member 34 and other members constitute a well-known shutter unit 31. A later-described stepping motor 190 for driving the third group lenses and a motor SM for driving the shutter blades are attached to the shutter ground plate 3. A pin 3c is embedded in the shutter ground plate 3 and engages with a cam surface 2b of the second group lens cam ring 2.

Because the shutter ground plate 3 is urged rearward in the direction along the optical axis by the compression spring 14, the pin 3c is pressed against the cam surface 2b of the second group lens cam ring 2 by the force of the spring 14. As the cam ring 5 rotates, the second group lens cam ring 2 also rotates as described above, and the shutter ground plate 3 on which motor 190 and the second group lenses are supported is moved in the direction along the optical axis by the cam surface 2b, thereby effecting a zooming operation of the second group lenses. As mentioned above, the shutter ground plate 3 can move forward along the optical axis against the force of the compression spring 14, and it is therefore possible to reduce the distance between the first group lens and the second group lenses by moving the shutter ground plate 3 forward along the optical axis when the lens assembly is retracted.

The third group lens moving mechanism and the operation of this mechanism will be described below.

Third group guide bars 15 and 16 are fixed on the third group holder 4 on which the third group lenses are supported. The guide bars 15 and 16 are placed in positions such as to be symmetrical on the optical axis, and extend parallel to the optical axis.

The guide bar 15 is slidably fitted in a hole 3c' of the shutter ground plate 3, with a compression spring 17 fitted around it. The spring 17 urges the third group holder 4 rearward in the direction along the optical axis to reduce a backlash between screw portions of a helicoid shaft 18 and female helicoid cylinder described below and a backlash in a reduction gear train. The other guide bar 16 is engaged with a cutout 3d of the ground plate to prevent the holder 4 from rotating on the guide bar 15. The helicoid shaft 18 disposed parallel to the guide bars 15 and 16 projects from the holder 4. The helicoid shaft 18 is screwed into the female helicoid cylinder formed integrally with a gear 19. It is therefore possible to move the third group holder 4 in the direction along the optical axis by rotating the gear 19.

Figure 2:
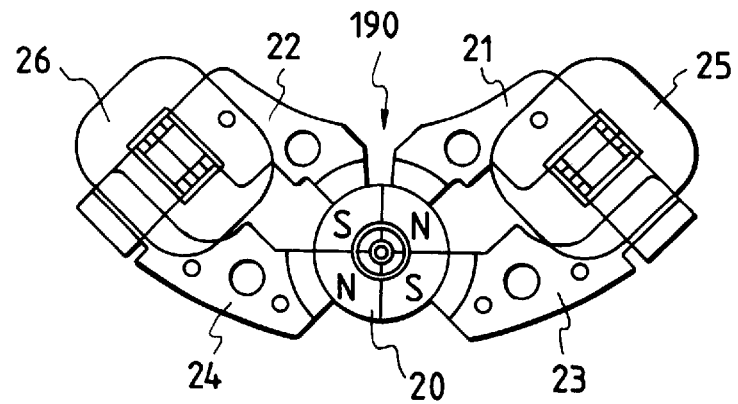
FIG. 2 is a front view of the stepping motor shown in FIG. 1.

FIG. 2 shows a front view of the stepping motor 190 which has a permanent magnet rotor 20 having four poles arranged in the circumferential direction, and whose basic construction is known per se. Yokes 21 and 23 form one magnetic circuit in cooperation with a bobbin 25, and yokes 22 and 24 form another magnetic circuit in cooperation with a bobbin 26.

A magnet cover 27 is provided which has a fitting hole 27a for rotatably positioning an end of the center shaft 28 fixed on the permanent magnet rotor 20. The other end 28a of the center shaft 28 is rotatably supported by a through hole 3e formed in the shutter ground plate 3. That is, the permanent magnet rotor 20 is supported between the magnet cover 27 and the shutter ground plate 3. Further, the shaft end 28a projects on the reverse side of the shutter ground plate 3, and a pinion 29 for transmitting the output from the motor is fixed to the projecting end of the shaft 28.

In the thus-constructed stepping motor 190, coils wound around the bobbins 25 and 26 are energized to magnetize the yokes 21 to 24, and the energization phases are suitably changed to rotate the permanent magnet rotor 20. The output therefrom is transmitted to the pinion 29. When the pinion 29 starts rotating, gears of a reduction gear train 30 are successively rotated, and the gear 19 integral with the female helicoid cylinder thereby starts rotating. By this rotation, the helicoid shaft 18 is driven in the direction along the optical axis to move the third group holder 4 in the same direction, i.e., to perform the zooming operation of the third group lenses.

As mentioned above, the lens system in accordance with this embodiment forms a rear focus type photographing lens such that focus correction, i.e., automatic focusing is performed with the third group lenses. Therefore the third group lenses also serve for lens position control for focus correction as well as the above-described zooming operation. However, the principle of driving for this control will not be described since the lenses are driven in the same manner.

The gear carrier plate 35 is fixed to a rear end portion of the straight-drive guide 6. The fixed shaft 35a on which the gear 7 is supported axially rotatably and the fixed shaft 35b on which the gear 8 is supported axially rotatably project from the gear carrier plate 35, and a threaded hole screwed around a helicoid shaft 36a, i.e., a female helicold hole 35c and another female helicoid hole 35d screwed around a helicoid shaft 37a are formed through the gear carrier plate 35 parallel to the optical axis. The positions of the female helicoid holes 35c and 35d are located on a circle having a diameter smaller than the outside diameter of the lens barrel 1 and are determined so that the helicoid shafts 36a and 37a screwed into the female helicoid holes 35c and 35d do not interfere with other members. On the gear carrier plate 35 is also provided a stopper pin 35e which can abut against the shutter ground plate 3.

A fixed lens barrel 38 is fixed on the camera body 39. The straight-drive guide 6 is inserted into the fixed lens barrel 38 so as to be movable along the optical axis. As shown in FIG. 3, the first group cam ring 5, the first group lens barrel 1 and the second group lens cam ring 2 are fitted in the straight-drive guide 6 by being disposed in an outer, intermediate, and inner positions in this order. The shutter unit 31 including the shutter ground plate 3 is placed inside the second group lens cam ring 2. At the rear of the shutter unit 31, the third group holder 4 and the gear carrier plate 35 attached to the rear end of the straight-drive guide 6 are placed.

The straight-drive guide 6, the first group cam ring 5, the first group lens barrel 1, the second group lens cam ring 2, the shutter unit 31, the third group holder 4 and the gear carrier plate 35 are movable in the fixed lens barrel 38 along the optical axis. In this specification, a unit constituted of these seven main components is referred to as a photographing lens barrel unit.

An axial threadlike projection 6f is formed in an outer circumferential surface of the straight-drive guide 6. The threadlike projection 6f is relatively slidably fitted in an axial groove (not shown) formed in an inner circumferential surface of the fixed lens barrel 38. The straight-drive guide 6 can therefore move in the fixed lens barrel 38 in the axial direction without rotating.

A large-diameter flange 6g is formed on the straight-drive guide at the rear end thereof. Projections 6c, 6d, and 6e (FIG. 6) for determining the position of the photographing lens barrel unit in the direction along the optical axis by the rotation of a bayonet ring 43 described later are formed on an outer circumferential surface of the flange 6g. The projections 6c, 6d, and 6e are engaged with the later-described bayonet ring 43.

In the camera body 39 are accommodated a locking device for stopping the rotation of the gear 50, a power transmission mechanism for making the gear carrier plate 35 and the straight guide 6 advance or retreat parallel to the optical axis, a power transmission mechanism for transmitting a force for driving the gear 8 through the gear 50, and a power transmission mechanism for rotating the bayonet ring 43 and releasing the straight-drive guide 6 from the retained state and the gear 50 from the locked state to enable the zoom driving force to be transmitted to the lens barrel unit. A threadlike projection 39f which engages with the teeth of the gear 8 when the lens unit is retracted is formed in an inner circumferential surface of the lens accommodation hole 39c of the camera body 39. When the lens barrel unit advances, retreats or is accommodated, the rotation of the gear 8 supported on the gear support plate 35 and for transmitting a torque to the cam ring 5 through meshing with the gear 50 is inhibited by the engagement between the threadlike projection 39f and the teeth of the gear 8 to prevent a change in the phase of the zooming mechanism.

These power transmission mechanisms are constituted of a ring gear 40 shown in FIG. 1, two gears 36 and 37 meshing with internal teeth of the ring gear 40, the helicoid shafts 36a and 37a formed integrally with the gears 36 and 37, the bayonet ring 43 having a gear portion 43d formed on its outer circumferential surface, and other members. The construction of these mechanisms will be described below with reference to FIGS. 1 to 9.

As shown in FIG. 1, the hole 39c in which the above-described photographing lens barrel unit can be accommodated is formed in the camera body 39. As shown in FIG. 3, a gear support shaft 39a fitted in a recess formed in an end surface of the gear 36, a gear support shaft 39b fitted in a recess formed in an end surface of the gear 37 project from an end surface of the camera body 39 formed at an innermost end of the hole 39c. The gear 36 is rotatably supported at a fixed position by the shaft 39a and the gear 37 is rotatably supported at a fixed position by the shaft 39b.

The gears 36 and 37 are formed as gears with helicoidal portions, that is, formed integrally with the helicoid shafts 36a and 37a, respectively. The helicoid shaft 36a is screwed into the female helicoid hole (threaded hole) 35c of the gear carrier plate 35, while the helicoid shaft 37a is screwed into the female helicoid hole (threaded hole) 35d of the gear carrier plate 35.

The ring gear 40 meshing with the gears 36 and 37 has external teeth 40a formed in its outer circumferential surface and internal teeth 40b formed in its inner circumferential surface. The gears 36 and 37 mesh with the internal teeth 40b of the gear 40.

As shown in FIG. 3, the ring gear 40 is rotatably disposed at an innermost position of the photographing lens barrel unit accommodation hole 39c of the camera body 39, its internal teeth 40b mesh with the gears 36 and 37, and its external teeth 40a mesh with a gear 48. The gear 48 projects to the outside through a window formed in an upper surface of the camera body 39, and meshes with an unillustrated gear which is driven by an unillustrated drive source.

A gear pressing plate 41 having a hole 41a freely fitted around the helicoid shaft 36a and another gear pressing plate 42 having a hole 42a freely fitted around the helicoid shaft 37a are respectively fitted around the helicoid shafts 36a and 37a to prevent the ring gear 40 and the gears 36 and 37 from moving in the axial direction. The pressing plates 41 and 42 are placed so as to face end surfaces of the gears 36 and 37 and the ring gear 40 and are fastened to the camera body 39 with small screws or the like.

The camera body 39 has a counter-bored portion 39d formed at the hole 39c opening edge, and the bayonet ring 43 is rotatably disposed on the counter-bored portion 39d. The gear portion 43d formed as an outer circumferential surface portion of the bayonet ring 43 meshes with a gear 47 for rotating the bayonet ring 43. Three stepped portions 43a, 43b, and 43c are formed on the bayonet ring 43. Bayonet ring pressing plates 44, 45, and 46 having resilient contact portions are engaged with these stepped portions of the bayonet ring 43 to prevent the bayonet ring 43 from moving in the axial direction. The pressing plates 44 to 46 are fastened to an end surface of the camera body 39 with small screws or the like. The positions in which the bayonet ring retaining plates 44 to 46 are placed correspond to the three projections 6c, 6d, and 6e of the straight-drive guide 6.

Locking/unlocking projections 43n and 43o are formed in the vicinity of the gear portion 43d of the bayonet ring 43 so as to extend in the direction along the optical axis. An operating extension 301b of a lock plate 301 described below is inserted between these projections 43n and 43o.

Figure 10:
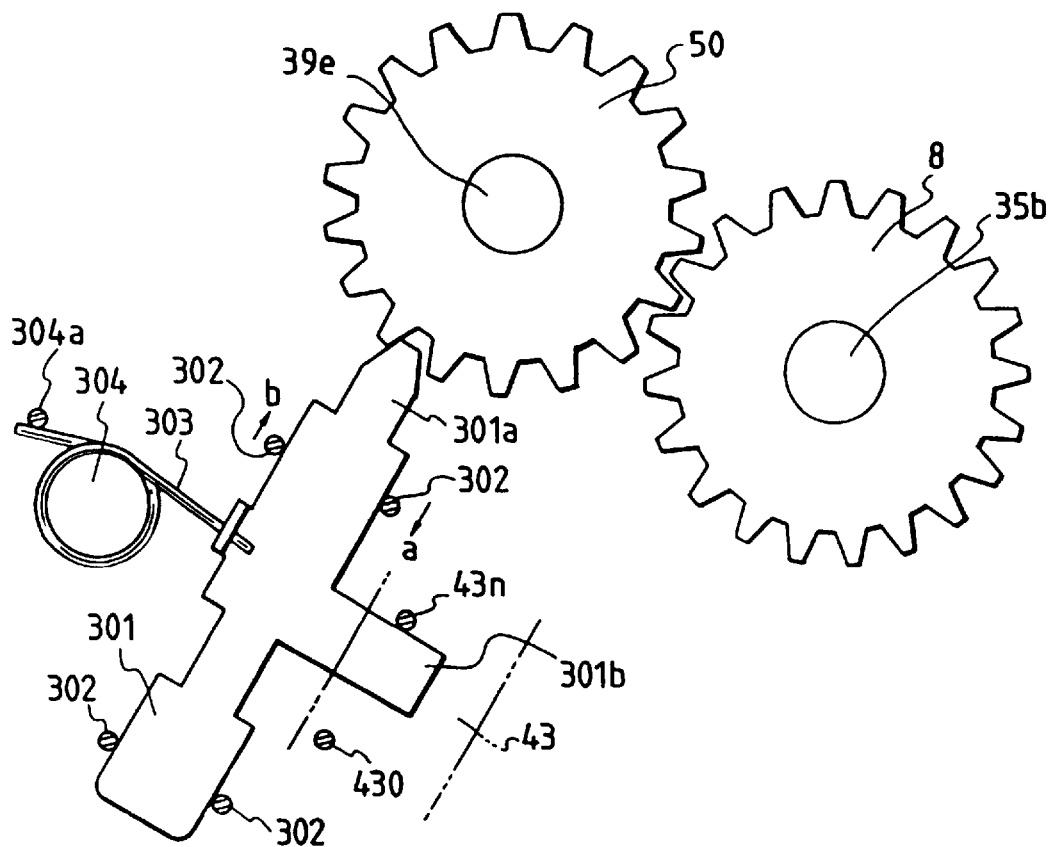
FIG. 10 is a plan view of the lock mechanism shown in FIG. 1.
Figure 11:
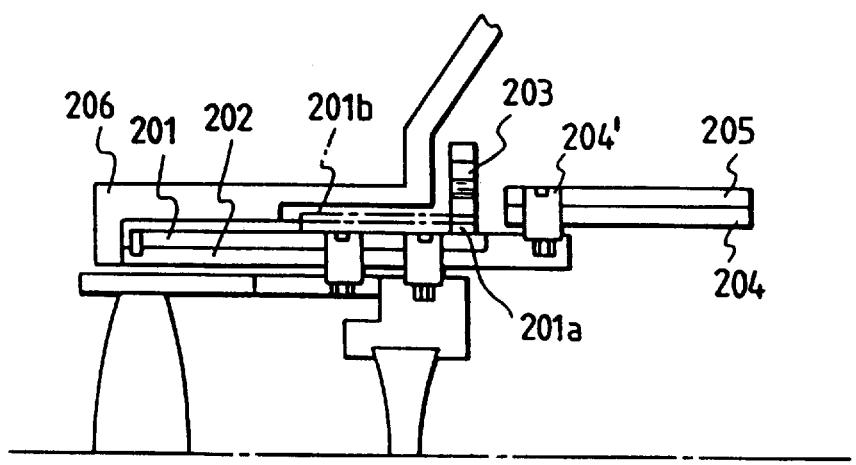
FIG. 11 is a cross-sectional view of a conventional collapsible type zoom lens barrel.

The lock plate 301 serves to inhibit the rotation of the gear 50 provided on the camera body 39 to transmit a torque to the cam ring 5 by engaging with a tooth of the gear 50. The lock plate 301 is disposed in front of the bayonet ring 43 and the operating extension 301b formed integrally with it is positioned between the projections 43n and 43o of the bayonet ring 43. As shown in FIG. 10, the lock plate 301 is mounted between two pairs of guide shafts 302 embedded in the camera body 39 so as to be slidable in the direction of the arrows. One end of a lock spring 303 which is supported by a spring support pin 304 embedded in the camera body 39 and whose other end is engaged with a spring stop pin 304a embedded in the camera body is engaged with the lock plate 301 to urge the lock plate 301 so that an engaging portion 301a formed at an end of the lock plate 301 constantly engages with the teeth of the gear 50.

Accordingly, if the bayonet ring 43 is rotated counter clockwise as viewed in FIG. 10, the projection 43n of the bayonet ring 43 is brought into engagement with the operating extension 301b of the lock plate 301 to slide the lock plate 301 in the direction of arrow a, thereby cancelling locking of the gear 50 and the lock plate 301. Conversely, if the bayonet ring 43 is rotated clockwise, the lock plate 301 slides in the direction of arrow b by the resilience force of the lock spring 303 and a pressing force applied by the engagement with the projection 43, so that the engaging portion 301a of the lock plate 301 engages with the teeth of the gear 50 to inhibit the rotation of the gear 50.

The operation of each component of the above-described zoom lens when the photographing lens barrel unit is put out from the collapsed position (from the state shown in the lower half of FIG. 3) will be described below.

When the gear 48 is rotated by the unillustrated retracting drive source, the ring gear 40 is rotated and the gears 36 and 37 meshing with the gear 40 are respectively rotated in the same direction and by the same rotational angle. The helicoid shafts 36a and 37a integral with the gears 36 and 37 are thereby rotated so that the gear carrier plate 35 into which the shafts 36a and 37a are screwed is moved forward and parallel to the optical axis.

The straight-drive guide 6 integral with the gear carrier plate 35 thereby advances in the fixed lens barrel 38, so that the first group lens cam ring 5, the first group lens barrel 1 and the second group lens cam ring 2 accommodated in the straight-drive guide 6 advance integrally with the straight-drive guide 6. At this time, the straight-drive guide 6 advances while the threadlike projection 6f formed on its outer circumferential surface is fitted in the axial groove formed in the inner circumferential surface of the fixed lens barrel 38. The straight-drive guide 6 therefore moves straight without rotating.

During this advancing process, the first group lens barrel 1 is spaced away from the shutter ground plate 3 and the third group lenses is increased by the effect of the spring 14 on the guide bar 12 fixed to the first group lens barrel 1, and the distance between the first group lens and the second group lenses is also increased gradually. This is because projections (not shown) rearwardly projecting from the third group lens holder 4 along the optical axis abut against the pressing plates 41 and the above-mentioned resilience force is thereby received. After the pin 35e projecting from the gear carrier plate 35 has been brought into abutment against the rear surface of the shutter plate, the projections (not shown) of the third group holder 4 are moved apart from the pressing plates 41, so that the first group lens barrel unit 1 is put out of the fixed lens barrel 38 while the distance between the first group lens and the second group lenses is constant.

Figure 6:
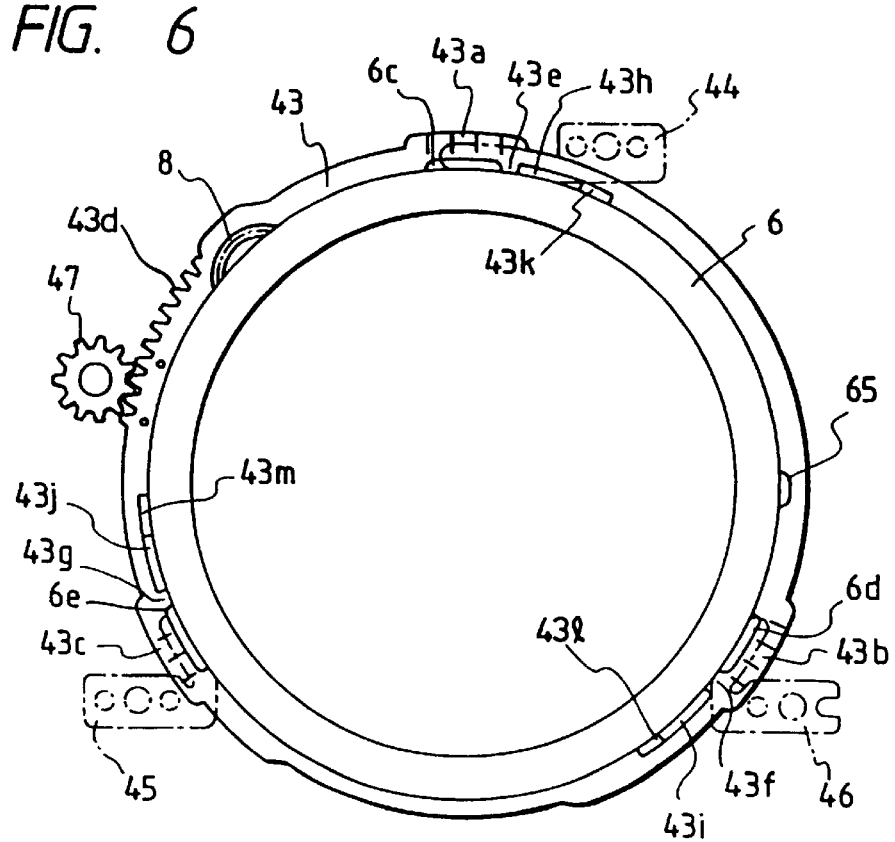
FIG. 6 is a diagram of a relationship between the bayonet ring and the first group cam ring shown in FIG. 1.

When the lens barrel unit is put out nearly completely, the lens barrel unit reaches a position at which it passes through the bayonet ring 43, the rear end flange portion 6g of the straight-drive guide 6 is fitted into the hole 38a of the fixed lens barrel 38, so that the straight-drive guide 6 is supported in the fixed lens barrel 38 by the flange portion 6g. FIG. 6 shows a state exhibited at this time.

When the power supply for putting out the lens barrel unit is stopped (that is, when the rotation of the gear 48 is stopped), the movement of the lens barrel unit is stopped. At this time, the bayonet ring pressing plates 44, 45 and 46 are supposed to produce a force such as to move back the three projections 6c, 6d, and 6e of the straight-drive guide 6 along the optical axis. However, since stepped portions 43a, 43b, and 43c such as those shown in FIG. 1 are formed on the portions of the bayonet ring 43 corresponding to the projections 6c, 6d, and 6e, the bayonet ring pressing plates are engaged with these stepped portions, so that the lens barrel unit is stopped at a position such that its rear end passes through the bayonet ring 43, that is, its rear end is positioned on the front side of a front end surface of the bayonet ring 43 shown in FIG. 6.

In this state, the power from the unillustrated drive source is transmitted to the gear 47 and the gear 47 starts rotating clockwise.

The bayonet ring 43 thereby starts rotating counterclockwise. As the bayonet ring 43 rotates, the stepped portions 43a, 43b, and 43c which have stopped the resilience force of the bayonet ring pressing plates 44, 45, and 46 are also rotated to cancel the stoppage, so that the bayonet ring pressing plates 44, 45, and 46 start producing a force to press the projections 6c, 6d, and 6e of the straight-drive guide 6. At this time, however, the bayonet ring 43 has already been rotated by a certain angle, and the projections 6c, 6d, and 6e of the straight-drive guide 6 are therefore pressed against portions 43e, 43f, and 43g of the bayonet ring by the pressing force.

As the rotation of the bayonet ring 43 is further continued, the rear end surfaces of the projections 6c, 6d, and 6e of the straight-drive guide 6 are then pressed by cams 43h, 43i, and 43j which are formed on the bayonet ring by being cut and raised. The force of this pressing prevails over the above-described pressing force to put out the lens barrel unit to a further extent.

Figure 7:
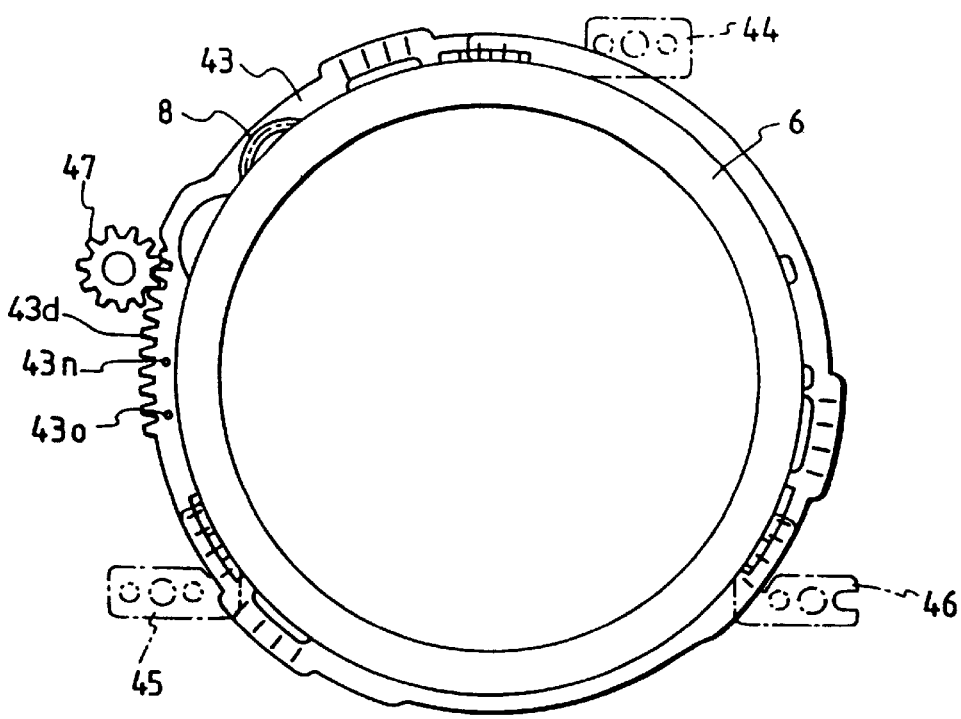
FIG. 7 is a diagram of a relationship between the bayonet ring and the first group cam ring shown in FIG. 1.

Thereafter, when the projections 6c, 6d, and 6e move onto flat-surface portions 43k, 43l and 43m provided as extensions from the cam surfaces 43h, 43i, and 43j of the bayonet ring 43 so as to be parallel to the above-mentioned front end surface, the power from the drive source is cut. About the time of moving onto the flat surfaces, the projection 43n is brought into engagement with the operating extension 301b of the lock plate 301 to move the lock plate 301 in the direction of arrow a to cancel the engagement with the gear 50, thereby enabling the gear 50 to rotate. FIG. 7 shows a front view of essential portions when these movements are completed. In this state, the process of putting out the lens barrel unit from the collapsed position and fixing the lens barrel unit in a photographing waiting state, and the gear 50 is released from the state of being locked with the lock plate 301, so that the zooming mechanism can be operated by the unillustrated drive source through the gear 50 and the gear 8. The state in the lens barrel at this time is shown in the upper half of FIG. 3.

Figure 8:
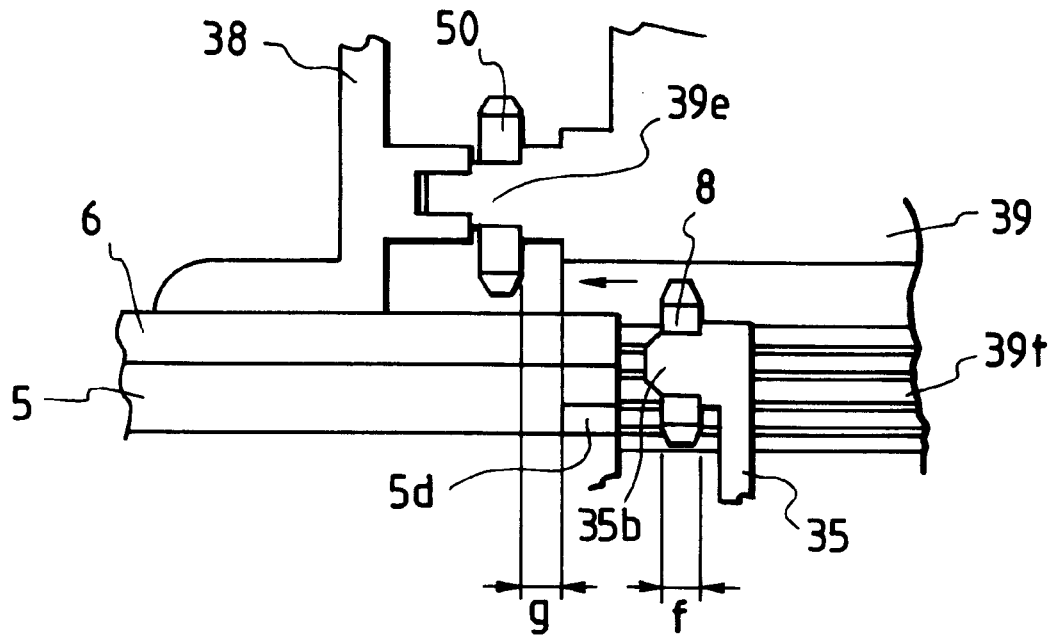
FIG. 8 is a diagram of connection between the gear 8 and the gear 50 shown in FIG. 1.
Figure 9:
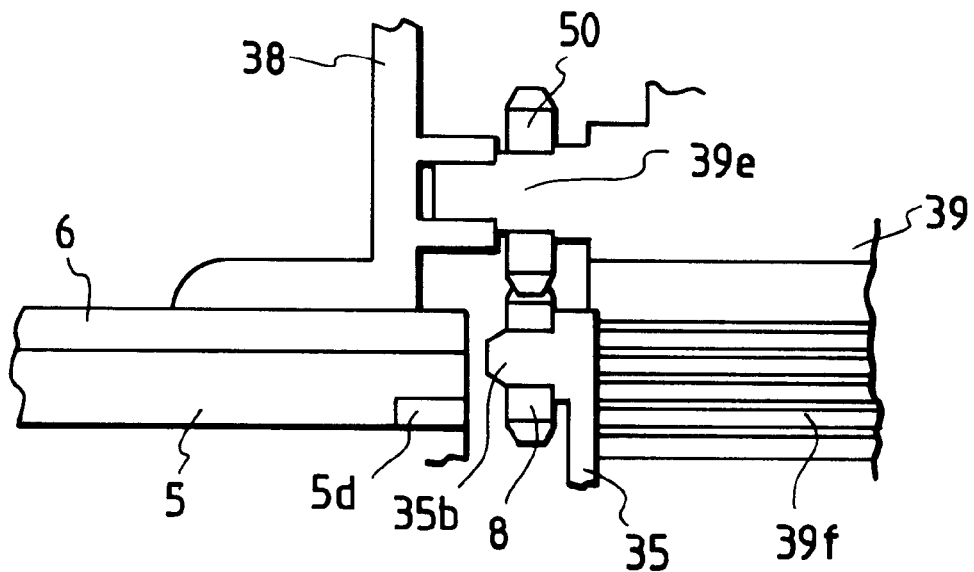
FIG. 9 is a diagram of connection between the gear 8 and the gear 50 shown in FIG. 1.

FIGS. 8 and 9 are a cross-sectional view and a plan view, respectively of portions showing a state in which the gear 8 rotating and driving the cam ring 5 and the gear 50 rotating by receiving the power from the unillustrated drive source are connected by the above-described operation of putting out the lens barrel unit from the retracted state, and a state in which the gear 50 is released from the locked state by the bayonet ring 43.

FIG. 8 shows an intermediate state in which the lens barrel unit is being put out from the collapsed position. In this state, the position of the gear 8 is still limited by the engagement with the threadlike projection 39f formed in the hole 39c of the camera body 39, that is, the gear 8 is inhibited from rotating, and the gear 8 is not connected to the gear 50. Thereafter, the lens barrel unit is further put out and the operation of connecting the gear 8 and the gear 50 is started immediately before the gear 8 is disengaged from the threadlike projection 39f, as shown in FIGS. 9 and 10. This is because the distance g between the surface onto which the bayonet ring 43 moves and the bottom surface of the gear is smaller than the thickness of the teeth of the gear 8, that is, f>g, as shown in FIG. 8. The gear 8 and the gear 50 are connected while their positions are respectively limited by the threadlike projection 39f and the lock plate 301, that is, the teeth phase in the previous meshing state is being maintained. The gear 8 and the gear 50 can therefore start meshing smoothly when the lens barrel unit is put out.

In this state, the bayonet ring 43 is rotated and the projection 43n of the bayonet ring 43 and the operating extension 301b of the lock plate 301 engage with each other. As the bayonet ring 43 further rotates, the lock plate 301 slides in the direction of arrow a to disengage from the gear 50, and the gear 50 is thereby allowed to rotate, so that the zooming operation can be performed. Conversely, when the lens barrel unit is retracted, the projection 43n of the bayonet ring 43 and the operating extension 301b of the lock plate 301 are disengaged from each other by the reverse rotation of the bayonet ring 43, the lock plate 301 slides in the direction of arrow b by the urging force of the lock spring 303, and the engaging portion 301a is thereby brought into engagement with the teeth of the gear 50. At a final stage of the bayonet ring rotation, the projection 43o engages with the operating extension 301b to firmly fix the lock plate 301 in the locking position, so that the teeth of the gear 50 are locked with the engaging portion 301a of the lock plate 301 without play.

Figure 4:
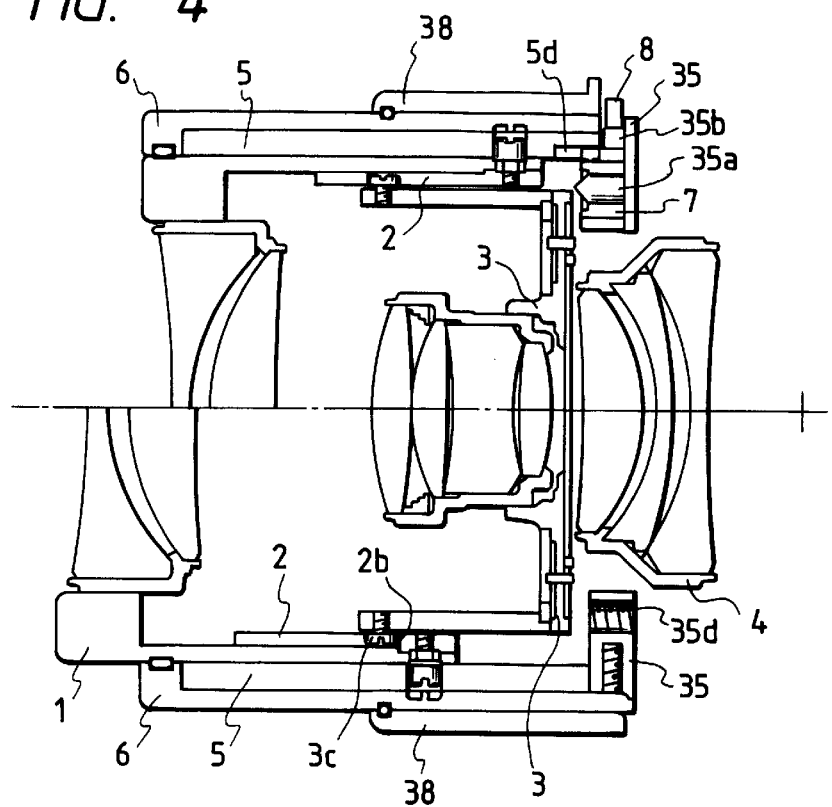
FIG. 4 is a cross-sectional view of the lens barrel shown in FIG. 1.

When the lens barrel unit is fully put out from the collapsed position, the first group, second group and third group lenses are not in photographing positions. The camera thereafter rotates the cam ring 5 by a certain angle by the above-mentioned driving means. The first group lens is thereby put out to a WIDE photographing position shown in the section of FIG. 4 corresponding to the camera portion below the optical axis. The distance between the first group lens and the second group lenses is further increased by the effect of the compression spring 14, and the pin 3c embedded in the shutter ground plate 3 is brought into abutment against the cam surface 2b of the second group lens cam ring 2, so that the second group lenses are maintained in a WIDE photographing position as in the case of the first group lens. FIG. 4 shows a cross section of the corresponding state of essential portions of the photographing lens unit below the optical axis. In the upper half section of FIG. 4 corresponding to the camera portion above the optical axis, a state is illustrated in which the operation of putting out the lens barrel unit from the collapsed position has been completed. This state corresponds to the state shown in the upper half section of FIG. 3 corresponding to the camera portion above the optical axis.

Figure 5:
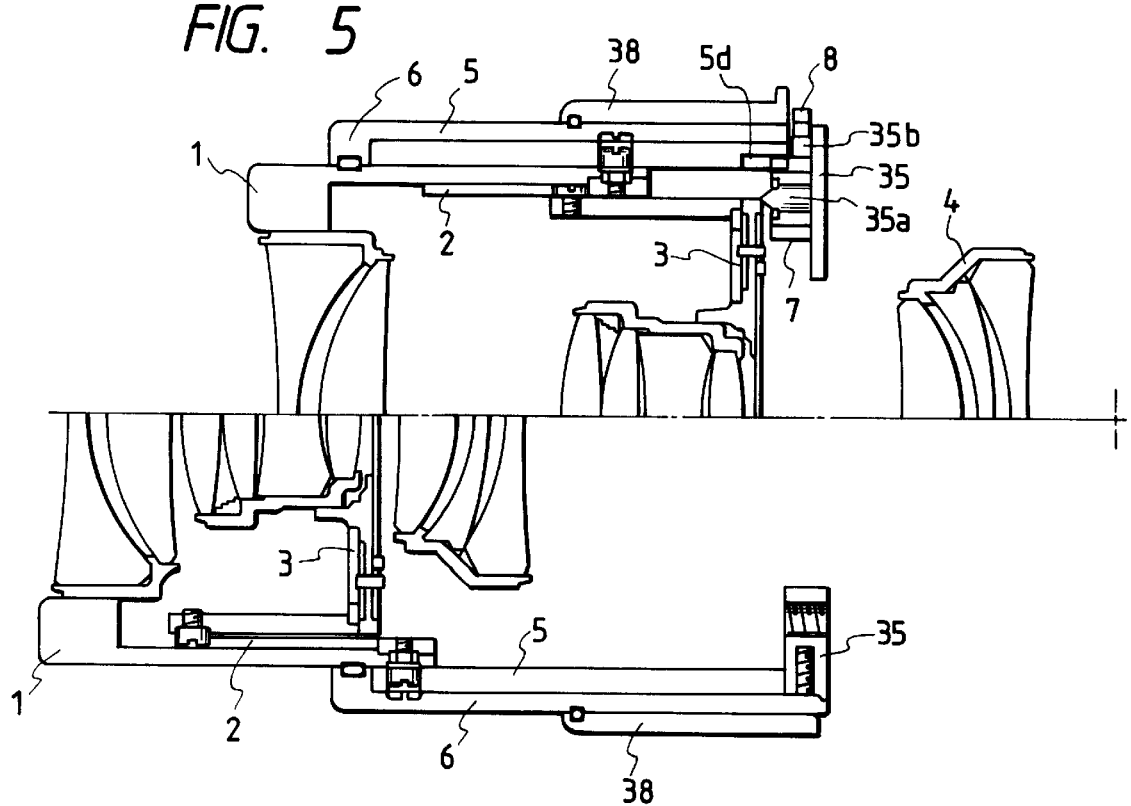
FIG. 5 is a cross-sectional view of an extended state and a collapsed state of the lens barrel shown in FIG. 1.

After the cam ring 5 has been rotated to set the lens barrel unit in this state, the third group lenses are moved to a suitable position by the stepping motor unit 190 in the above-described manner to complete the preparation of the photographing lens system for WIDE photographing. FIG. 5 shows a cross section of the corresponding state of essential portions of the photographing lens system below the optical axis. In the lower half section of FIG. 5 corresponding to the camera portion below the optical axis, a state is illustrated in which the photographing lens system is set in a TELE position by zooming. This operation will not be described further since details of the zooming operation have been described above.

When the lens barrel unit is retracted from the put out state, each part thereof is only moved reversely in comparison with the above-described operation of putting out the lens barrel unit from the collapsed position. Therefore details of the retracting operation will not be described further.

In this embodiment, as described above, in the retracted state where the lens barrel is accommodated in the camera body, both the input gear 8 and the gear 50 are stopped from rotating for the purpose of connecting these gears to form the zoom driving mechanism. For this reason, when these gears are disconnected, the phase relationship therebetween can be maintained even if the camera is vibrated by the operation of carrying the camera, thereby ensuring that the input and output gears can be smoothly connected when the lens barrel is put out.

Since the phase relationship between these gears can be maintained when they are disconnected, a part of the output from the output gear on the camera body side can be separated to be used as a drive source for the zoom finder.

Figure 12:
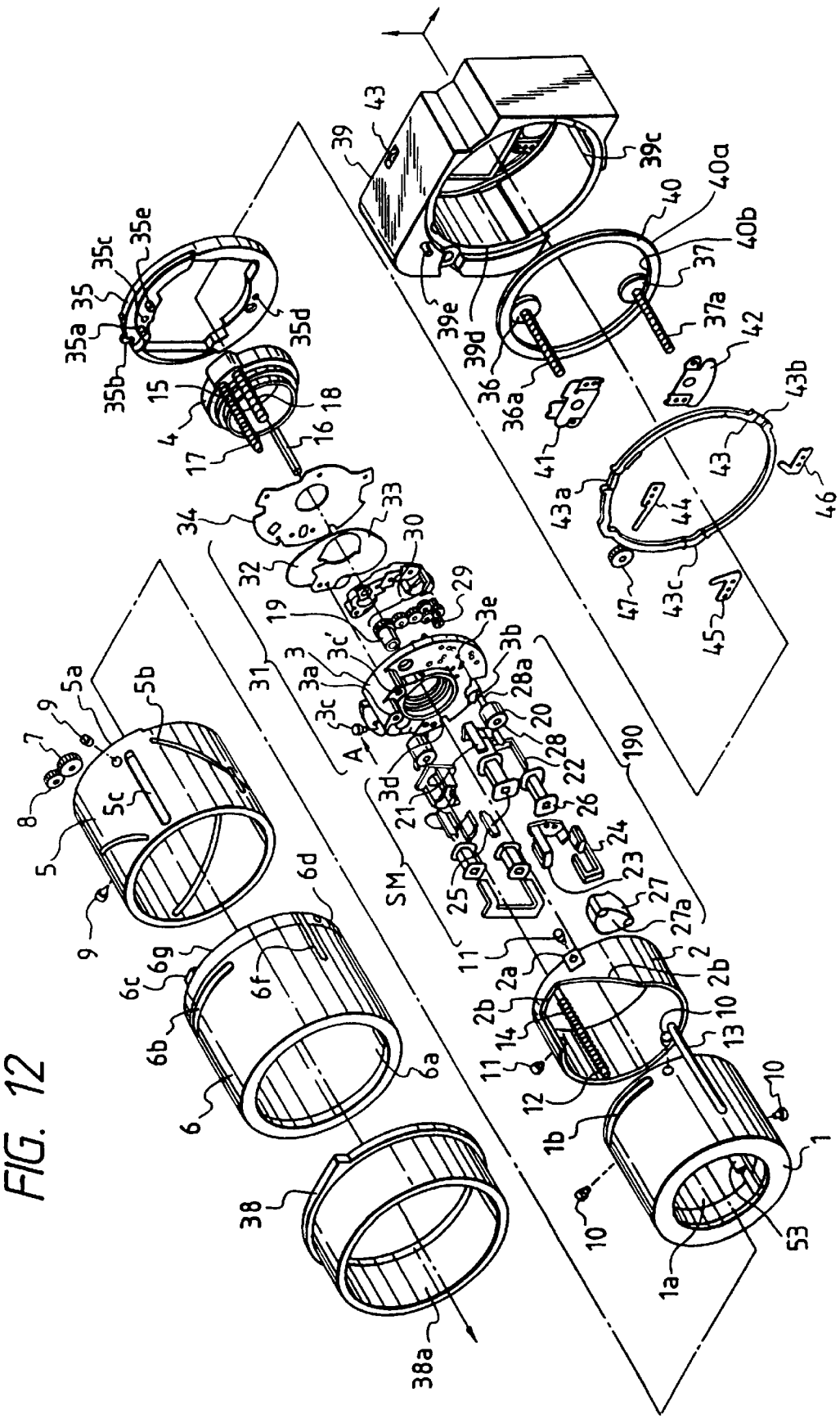
FIGS. 12 to 31 show a camera with a zoom lens in accordance with a second embodiment of the present invention.

FIG. 12 is an exploded perspective view of a photographing lens barrel unit of a camera with a zoom lens in accordance with a second embodiment of the present invention. Components of this embodiment identical or corresponding to those of the camera shown in FIGS. 1 to 10 are indicated by the same reference characters.

Figure 14:
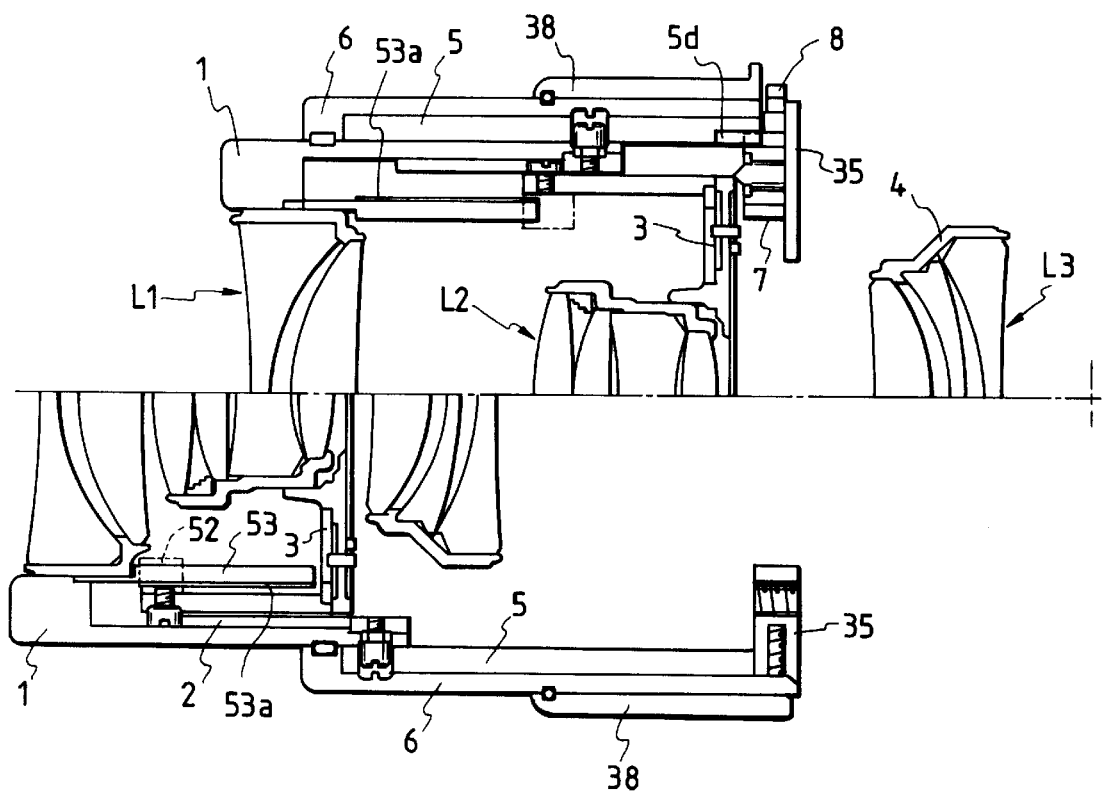

Referring to FIG. 12, the zoom lens has a first group lens barrel 1 having an end portion 1a on which a first group lens L1 shown in FIG. 14 is supported, a second group lens cam ring 2 positioned in the bore of the lens barrel 1 and rotatably fitted therein, a shutter ground plate 3 on which second group lenses L2 shown in FIG. 14 are supported and on which a well-known type of shutter unit is also supported, a third group holder 4 on which third group lenses L3 are supported, a first group cam ring 5 for determining the position of the first group lens L1 in the direction along the photographing optical axis, and a straight-drive guide 6 which has a bore in which the first group cam ring 5 is rotatably fitted and which has a cut groove 6a formed in its inner surface so that the first group lens barrel 1 can move straight in the direction along the photographing optical axis alone. In the zoom lens thus constructed, an internal gear 5d (see FIG. 14) is provided on an inner surface rear end portion of the cam ring 5, a gear 7 engages with the internal gear 5d, and a gear 8 which receives power from an unillustrated drive source which is known per se meshes with the gear 7. The cam ring 5 is rotatably supported on an inner circumferential surface of the straight-drive guide 6, but it is stopped from moving in the direction along the optical axis because an embedded pin 9 engages with an elongated hole 6b which is formed in the straight-drive guide 6 so as to extend in a circumferential direction.

A pin 10 similar to the embedded pin 9 is embedded in a rear portion of the first group lens barrel 1. The pin 10 is slidable in a cam groove 5b formed in the cam ring 5 as well as in the cut groove 6a of the straight-drive guide 6.

When the gear 8 starts rotating by receiving the power from the unillustrated drive source, the gear 7 rotates to transmit its torque to the internal gear 5d of the cam ring 5, and the cam ring 5 thereby starts rotating. Since the position of the pin 10 embedded in the first group lens barrel 1 is limited by the cam groove 5b and the cut groove 6a, it is possible to operate the first group lens L1 for zooming by driving the lens barrel 1 in the direction along the optical axis to an extent corresponding to the displacement of the cam groove 5b in the same direction caused by the rotation of the cam ring 5.

The second group lens zooming mechanism and the zooming operation of this mechanism will next be described below. The second group lens cam ring 2 is rotatably supported on an inner circumferential surface of the first lens barrel 1. A pin 11 embedded in a rear end portion 2a of the cam ring 2 is slidably inserted in a circumferential elongated groove 1b formed in the first group lens barrel 1 and in an elongated groove 5c formed in the cam ring 5 so as to extend in the direction along the optical axis.

When the cam ring 5 starts rotating as described above, the first group lens barrel 1 moves along the optical axis. The second group lens cam ring 2 is moved along the optical axis integrally with the first group lens barrel 1, since its movement in the direction along the optical axis is stopped by the elongated groove 1b of the first group lens barrel 1 engaging with the embedded pin 11. Also, as the cam ring 5 rotates, the second group lens cam ring 2 moves in the direction along the optical axis integrally with the first group lens barrel 1 and simultaneously rotates through the same angle as the rotation of the cam ring 5, since the embedded pin 11 is stopped from rotating relative to the cam ring 5 by the elongated groove 5c of the cam ring 5.

The first group lens barrel 1 has a pair of guide bars 12 and 13 fixed to its internal portions and extending parallel to the optical axis. The guide bar 12 has a compression spring 14 around its outer circumferential portion and is slidably fitted in a hole 3a of the shutter ground plate 3. The guide bar 12 produces a force for urging the shutter ground plate 3 rearward (in the direction of arrow A as viewed in FIG. 12) and parallel to the optical axis. The other guide bar 13 is engaged with an cutout 3b of the shutter ground plate 3 to prevent the ground plate 3 from rotating on the fitting hole 3a. Therefore the ground plate 3 can only move in the direction along the optical axis. A pin 3c is fixedly embedded in the shutter ground plate 3 and engages with a cam portion 2b of the second group lens cam ring 2. The position of the shutter ground plate 3 in the direction along the optical axis is limited by the cam portion 2b of the second group cam ring 2 engaging with the embedded pin 3c, while the shutter ground plate 3 receives the rearward urging force applied by the compression spring 14 along the optical axis. The position in the direction along the optical axis of the shutter ground plate 3 on which the second group lenses L2 are supported is thereby determined with the zooming operation of the first group lens L1 based on the rotation of the cam ring 5, thus operating the second group lenses L2 for zooming. As mentioned above, the shutter ground plate 3 can move forward along the optical axis against the force of the compression spring 14, and it is therefore possible to reduce the distance between the first group lens L1 and the second group lenses L2 by receiving the pressing force that is forwardly applied along the optical axis when the lens assembly is retracted.

The third group lens moving mechanism and the operation of this mechanism will be described below. Third group guide bars 15 and 16 are fixed on the third group holder 4 on which the third group lenses L3 are supported. The guide bars 15 and 16 are placed in positions such as to be generally symmetrical on the optical axis, and extend parallel to the optical axis.

The guide bar 15 has a compression spring 17 around its outer circumferential portion and is slidably fitted in a hole 3c' of the shutter ground plate 3. The other guide bar 16 is engaged with a cutout 3d of the ground plate to make the holder 4 movable in the direction alone the optical axis alone. A male helicoid screw 18 is embedded in the holder 4 so as to extend parallel to the optical axis. The helicoid 18 is engaged with a female helicoid gear 19. The third group holder 4 can be moved in the direction along the optical axis by the rotation of the gear 19.

Figure 13:
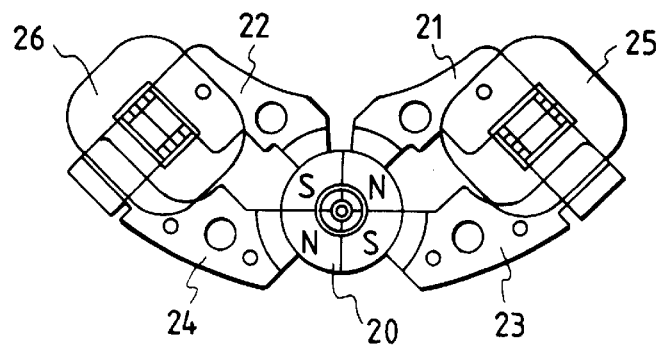

A stepping motor 190 is provided which has a permanent magnet rotor 20 having four poles arranged in the circumferential direction, and whose basic construction is known per se. Yokes 21 and 23 form one magnetic circuit in cooperation with a bobbin 25, and yokes 22 and 24 form another magnetic circuit in cooperation with a bobbin 26. FIG. 13 shows a front view of the construction of the stepping motor.

A magnet cover 27 is provided which has a fitting hole 27a for rotatably positioning an upper end of the center shaft 28 fixed on the permanent magnet rotor 20. The other end 28a of the center shaft 28 is rotatably supported by a through hole 3e formed in the shutter ground plate 3. That is, the permanent magnet rotor 20 is supported between the magnet cover 27 and the shutter ground plate 3. Further, the shaft end 28a projects on the reverse side of the shutter ground plate 3, and a pinion 29 for transmitting the output from the motor is fixed to the projecting end of the shaft 28.

In the thus-constructed stepping motor 190, coils wound around the bobbins 25 and 26 are energized to magnetize the yokes 21 to 24, and the energization phases are suitably changed to rotate the permanent magnet rotor 20. The output therefrom is transmitted to the pinion 29. When the pinion 29 starts rotating, gears of a reduction gear train 30 are successively rotated, and the output from this gear train is transmitted to the female helicoid gear 19 to start rotating this gear. By this rotation, the male helicoid 18 is driven in the direction along the optical axis to move the third group holder 4 in the same direction, i.e., to perform the zooming operation of the third group lenses.

In this embodiment, the lens system forms a rear focus type photographing lens such that focus correction, i.e., automatic focusing is performed with the third group lenses L3. Therefore the third group lenses L3 also serve for lens position control for focus correction as well as the above-described zooming operation. However, the principle of driving for this control will not be described since the lenses are driven in the same manner. The compression spring 17 has a function of urging the third group holder 4 rearward along the optical axis so that backlashes between the male helicoid and the female helicoid gear 19 and the reduction gear train 30 are biased, although this function has not been mentioned above. Actual zooming and focusing will be described later in detail. Further, the above-described shutter ground plate 3 may be provided with a well-known shutter driving unit 31 previously proposed by the applicant of the present invention to have a function of driving a pair of shutter blades 32 and 33 retained between a blade retainer 34 and the ground plate 3 to expose a photography film.

A helicoid plate 35 is fixed to a rear end portion of the straight-drive guide 6. The helicoid plate 35 has a projections 35a and 35b on which the gears 7 and 8 are respectively supported rotatably, and female helicoid portions 35c and 35d engaged with helicoid portions 36a and 37a of helicoid gears 36 and 37 described later. As is apparent from the figures, the female helicoid portions 35c and 35d are positioned inside relative to the outside diameter of the lens barrel unit.

The photographing lens barrel unit is formed of the above-described components parts including the helicoid plate 35.

The operation of retracting the above-described photographing lens unit will now be described below.

Figure 17:
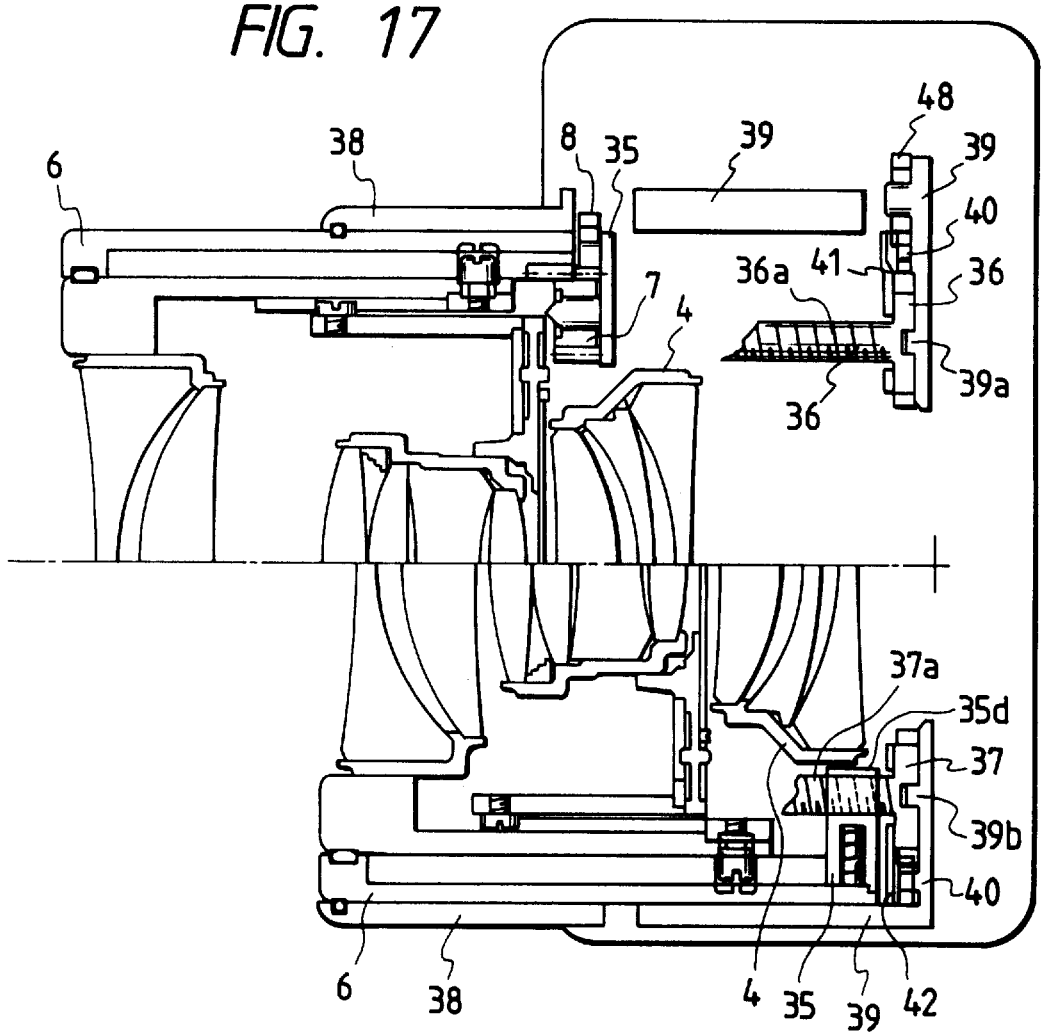

FIG. 17 is a longitudinal sectional view of essential portions taken along a plane containing the photographing optical axis of the camera. In the lower half of FIG. 17 corresponding to the camera portion below the optical center, a state in which the above-described lens barrel unit is accommodated in a camera body 39 is illustrated. In the upper half of FIG. 17 corresponding to the camera portion above the optical center, a state in which the lens barrel unit is put out from the collapsed position is illustrated.

The helicoid gears 36 and 37 are supported axially rotatably on shafts 39a and 39b provided at the bottom of the camera body, and are stopped from moving in the direction along the optical axis by pressing plates 41 and 42 attached to the camera body 39 with unillustrated screws. The male helicoid portions 36a and 37a of the gears 36 and 37 are engaged with female helicoid portions 35c and 35d (see FIG. 12) of the above-described helicoid plate 35 to put in/out the lens barrel unit.

A internal/external gear 40 is provided which has an internal gear portion formed on its inner diametral portion. This gear portion meshes with the helicoid gears 36 and 37. The internal/external gear 40 also has an external gear portion formed on its outer circumferential portion. This external gear portion meshes with a gear 43 which transmits power from an unillustrated drive source. In this component arrangement, when the gear 43 provided as member for driving the above-described lens barrel unit starts rotating by receiving the unillustrated drive source, the internal/external gear 40 rotates on the photographing optical axis. The helicoid gears 36 and 37 meshing with the internal gear portion of the gear 40 then start rotating in the same direction by the same angle to uniformly apply a force to the female helicoid plate 35, thereby enabling the lens barrel unit to be smoothly put in/out.

A fixed lens barrel 38 is fixed on the camera body 39. The lens barrel unit is retained in a hole 39a formed in the camera body 39 and a hole 38a formed in the fixed lens barrel 38 so as to be movable forward/rearward along the optical axis. During this movement, the lens barrel unit does not rotate because slidable fitting grooves are formed in the body 39 and the fixed lens barrel 38 at the position corresponding to a rotation stop projection 6f of the straight-drive guide 6.

Figure 18:
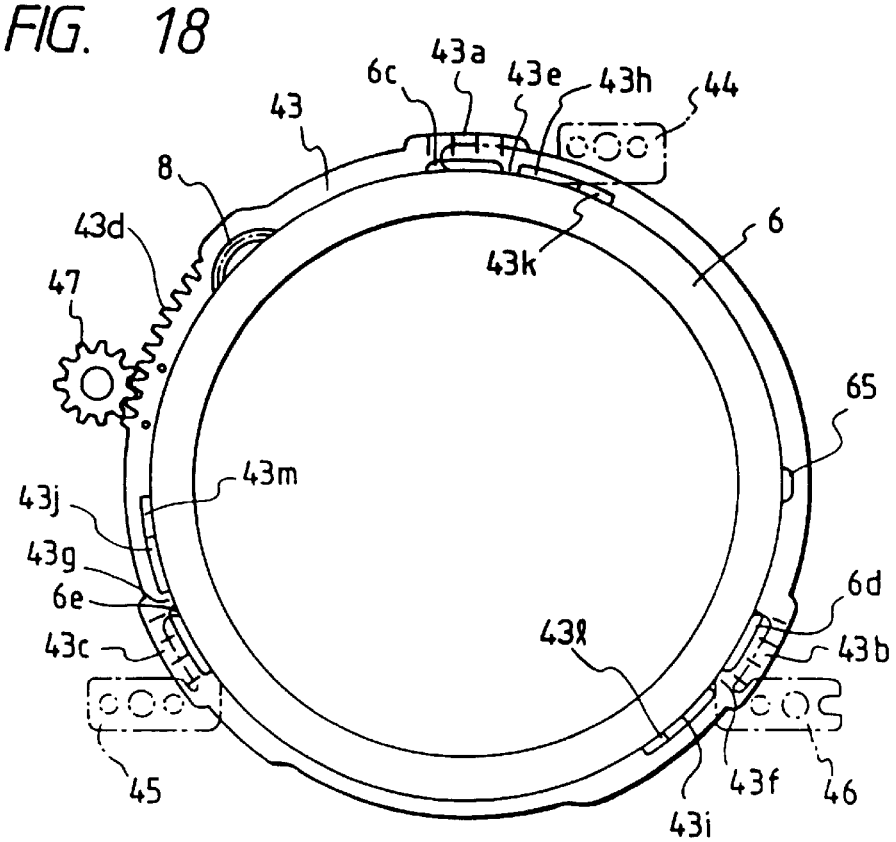

The gear or the bayonet ring 43 shown in FIG. 12 is positioned on a front counter-bored portion 39d of the camera body 39. As shown in FIG. 18, the bayonet ring 43 has an opening shape such that the straight-drive guide 6 including three projections 6c, 6d, and 6e, the rotation stop projection 6f and the zoom driving gear 8 provided on its rear portion can pass through the bayonet ring 43. Bayonet ring pressing members 44, 45, and 46 are disposed in front of the bayonet ring 43 attached to the camera body 39 with respect to the direction along the optical axis. The bayonet ring pressing members 44, 45, and 46 have resilient contact portions positioned so as to face the three projections 6c, 6d, and 6e of the straight-drive guide 6. The bayonet ring and the bayonet pressing members constitute a lens barrel retainer. When the lens barrel unit is put out from the collapsed position, the gear 43 rotates by receiving the output from the unillustrated drive source, the internal/external gear 40 thereby rotates, and the helicoid gears 36 and 37 start rotating in the same direction by the same angle. By the rotation of the helicoid gears 36 and 37, the female helicoid plate 35 is forced forward in the direction along the optical axis, and the lens barrel unit is guided by the hole 39c of the camera body 39 and the hole 38a of the fixed lens barrel 38 to be put out while being stopped by the rotation stop projection 6f from rotating. At this time, the distance between the first group lens and the second group lenses is gradually increased by the effect of the compression spring 14 provided around the guide bar 12 as described above. After the pin 35e projecting from the female helicoid plate 35 has been brought into abutment against a rear surface of the shutter ground plate 3, the third group holder 4 and raised portions 41a of the pressing plates 41 are released from the abutting state, so that the lens barrel unit is put out while the distance between the first group lens L1 and the second group lens L2 is constantly maintained.

When the lens barrel unit is put out nearly completely, the lens barrel unit reaches a position at which it passes through the bayonet ring.

Then a large-diameter portion 6g formed at the rear end of the straight-drive guide 6 is fitted into the hole 38a of the fixed lens barrel 38 without play. FIG. 18 shows a front view of essential portions of the straight-drive guide 6, the bayonet ring 43, the bayonet pressing members 44, 45, and 46 in this state.

When the power supply for putting out the lens barrel unit is stopped, the lens barrel unit is stopped in the above-described state. At this time, the bayonet ring pressing members 44, 45 and 46 are supposed to produce a force such as to move back the three projections 6c, 6d, and 6e of the straight-drive guide 6 along the optical axis. However, since stepped portions 43a, 43b, and 43c such as those shown in FIG. 12 are formed on the portions of the bayonet ring 43 corresponding to the projections 6c, 6d, and 6e, the bayonet ring pressing members are engaged with these stepped portions, so that the lens barrel unit is stopped at a position such that its rear end passes through the bayonet ring 43, that is, its rear end is positioned on the front side of a front end surface 43d of the bayonet ring 43 shown in FIG. 18.

In this state, the power from the unillustrated drive source is transmitted to the gear 47 and the gear 47 starts rotating clockwise. With the above-described movement, the bayonet ring 43 starts rotating counterclockwise. As the bayonet ring 43 rotates, the stepped portions 43a, 43b, and 43c which have stopped the resilient force of the bayonet ring pressing members 44, 45, and 46 are also rotated to cancel the stoppage, so that the bayonet ring pressing members 44, 45, and 46 start producing a force to press the projections 6c, 6d, and 6e of the straight-drive guide 6. At this time, however, the bayonet ring 43 has already been rotated by a certain angle, and the projections 6c, 6d, and 6e of the straight-drive guide 6 are therefore pressed against portions 43e, 45f, and 43g of the bayonet ring by the pressing force.

As the rotation of the bayonet ring 43 is further continued, the rear end surfaces of the projections 6c, 6d, and 6e of the straight-drive guide 6 are then pressed by cams 43h, 43i, and 43j which are formed on the bayonet ring by being cut and raised. The force of this pressing prevails over the above-described pressing force to put out the lens barrel unit to a further extent.

Thereafter, when the projections 6c, 6d, and 6e move onto flat-surface portions 43k, 43l and 43m provided as extensions from the cam surfaces 43h, 43i, and 43j of the bayonet ring 43 so as to be parallel to the front end surface 43d, the power from the drive source is cut.

Figure 19:
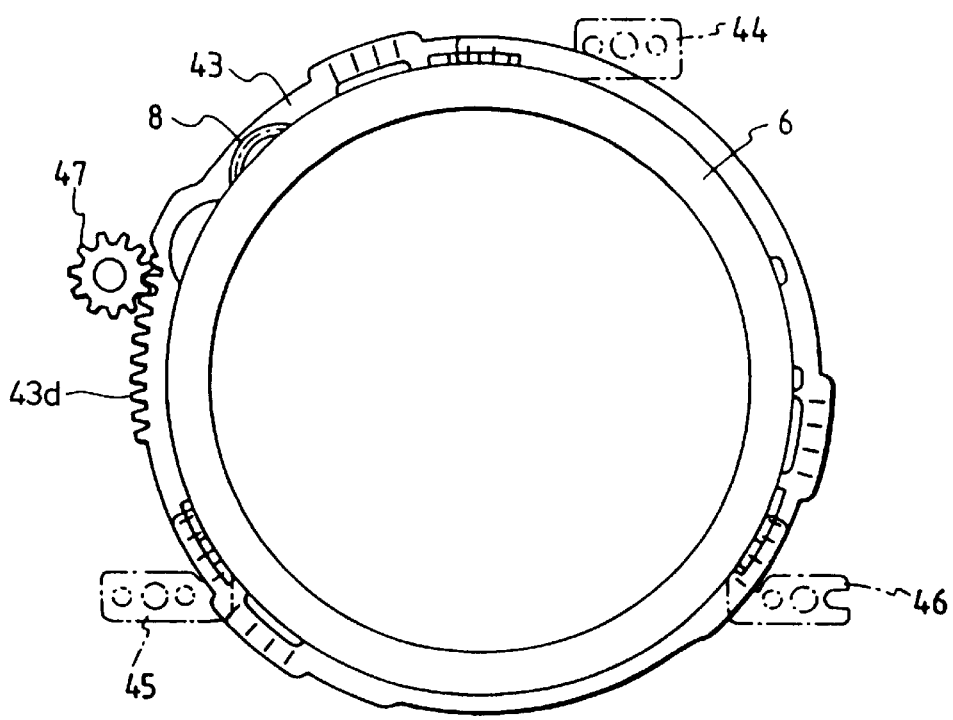

FIG. 19 shows a front view of portions in the state where the above process is completed. In this state, the operation of putting out the lens barrel unit from the retracted state is completed and the photographing lens barrel unit is firmly held at a photographing waiting position by the engagement means. The state of the photographing lens at this time is illustrated in the upper section of FIG. 17 corresponding to the camera portion above the optical axis.

Figure 20:
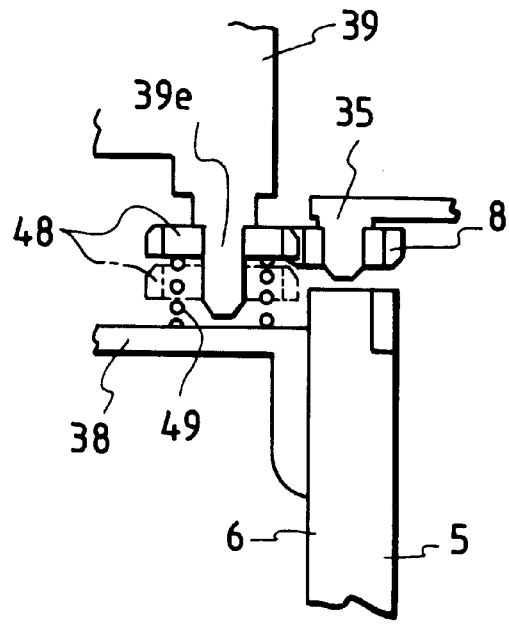
Figure 21:
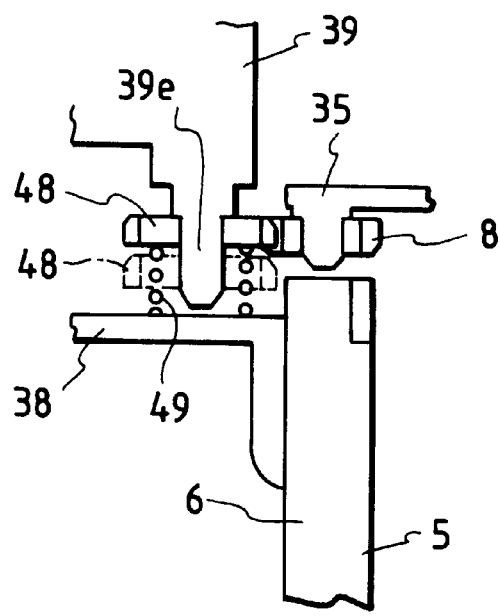

FIGS. 20 and 21 are essential portion cross-sectional views showing a state in which the gear 8 for rotating the cam ring 5 and a gear 40 which rotates by receiving power from an unillustrated drive source are connected by the above-described operation of putting out the lens barrel unit from the collapsed position. FIG. 20 shows an intermediate state in which the lens barrel unit is being put out from the collapsed position. In this state, the gear 8 and the gear 48 are not connected yet. When the lens barrel unit is further put out to an extent such as to enable connection between the gears 8 and 40 as shown in FIG. 21, and when it is put out under the condition that the teeth of the gears 8 and 48 do not interfere with each other (that is, the gears 8 and 48 can mesh with each other smoothly), the gear 48 is set in a waiting position indicated by the solid line by receiving the urging force of a coil spring 49 and is then connected to the gear 8.

However, if the teeth of the gears 8 and 48 interfere with each other as the lens barrel unit is put out, the gear 48 retreats to a position indicated by the dot-dash line in FIG. 21 against the urging force of the coil spring 49 while being rotatably supported on a shaft 39e projecting from the camera body 48. Even when the gear 48 is in the retreating position, the driving force from the unillustrated driving force is transmitted (for example, by increasing the thickness of the teeth so that the gear can mesh with the unillustrated driving gear in the retreating position). When the gear 48 rotates by receiving the power from the power source to a position such as to be able to mesh with the gear 8, the gear 48 slides to a position indicated by the solid line in the figure to connect to the gear 8.

Figure 22:
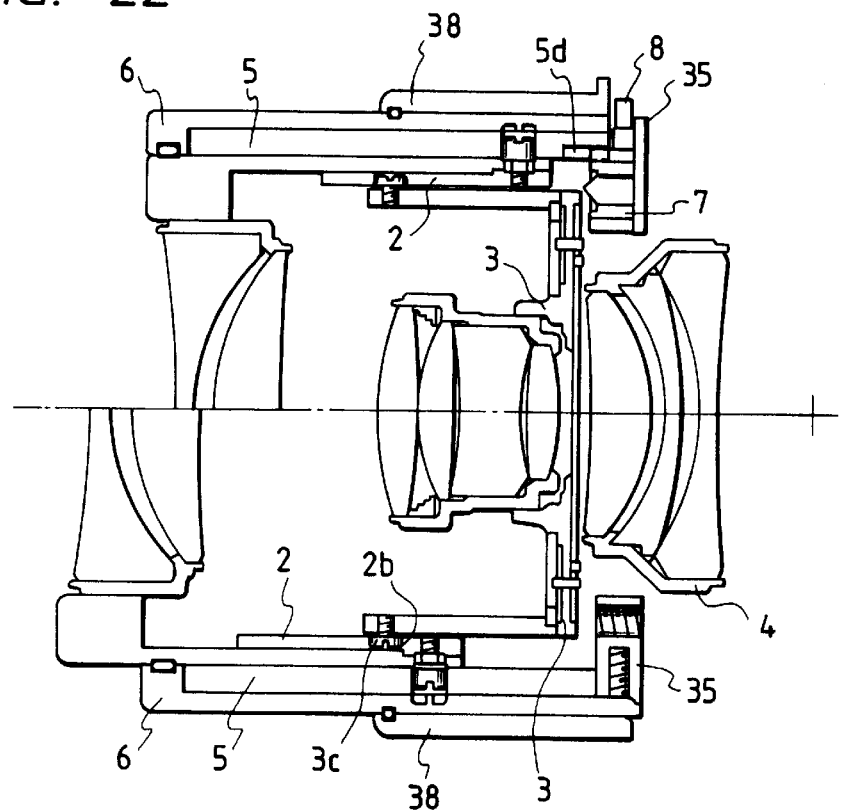

When the lens barrel unit is fully put out from the collapsed position, the first group, second group and third group lenses are not in photographing positions. The camera thereafter rotates the cam ring 5 by a certain angle by the above-mentioned driving means. The first group lens is thereby put out to a WIDE photographing position shown in the section of FIG. 22 corresponding to the camera portion below the optical axis. With this operation, the distance between the first group lens and the second group lenses is further increased by the effect of the compression spring 14, and the pin 3c embedded in the shutter ground plate 3 is brought into abutment against the cam surface 2b of the second group lens cam ring 2, so that the second group lenses are maintained in a WIDE photographing position as in the case of the first group lens. FIG. 22 shows a cross section of the corresponding state of essential portions of the photographing lens unit below the optical axis. In the upper half section of FIG. 22 corresponding to the camera portion above the optical axis, a state is illustrated in which the operation of putting out the lens barrel unit from the collapsed position has been completed. This state corresponds to that shown in the upper half section of FIG. 17 corresponding to the camera portion above the optical axis.

Figure 23:
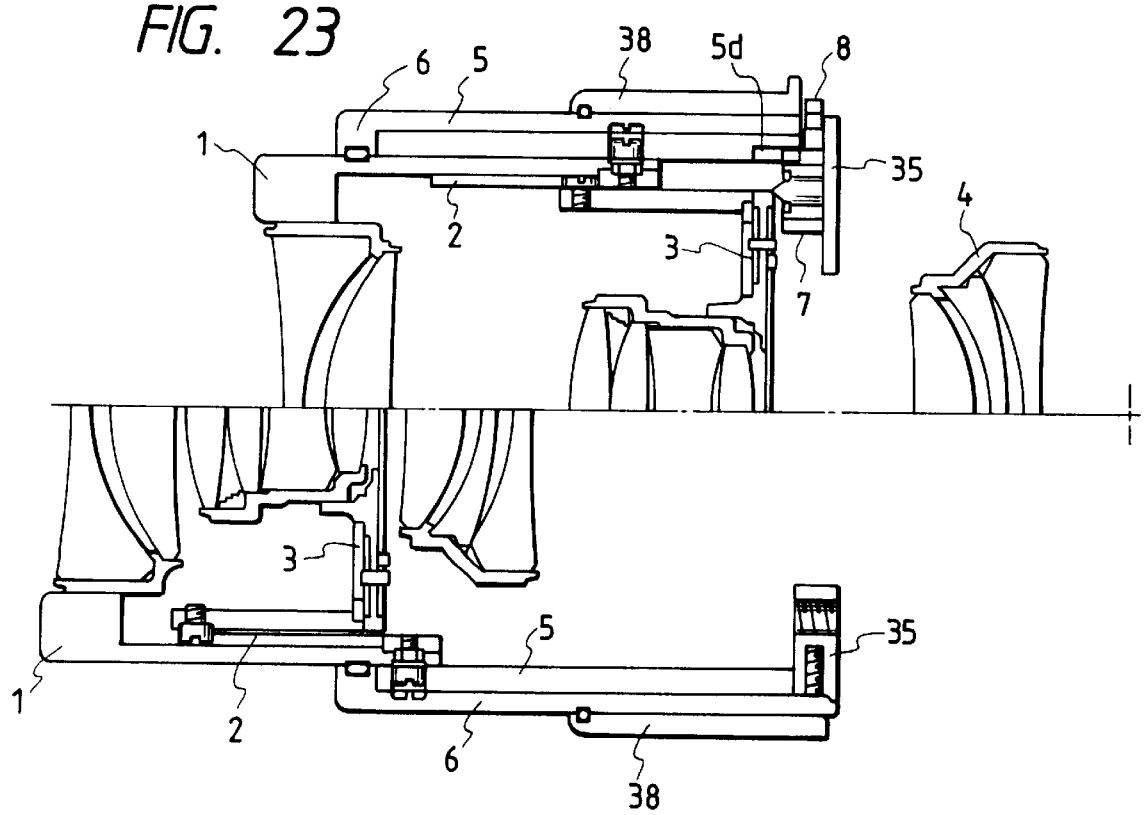

After the cam ring 5 has been rotated to set the lens barrel unit in this state, the third group lenses are moved to a suitable position by the stepping motor unit 190 in the above-described manner to complete the preparation of the photographing lens system for WIDE photographing. FIG. 23 shows a cross section of the corresponding state of portions of the photographing lens system below the optical axis. In the lower half section of FIG. 23 corresponding to the camera portion below the optical axis, a state is illustrated in which the photographing lens system is set in a TELE position by zooming. This operation will not be described further since details of the zooming operation have been described above.

When the lens barrel unit is retracted from the put-out state, each part is only moved reversely in comparison with the above-described operation of putting out the lens barrel unit from the collapsed position. Therefore details of the retracting operation will not be described.

The mechanical construction and the operation of the zoom lens has been described above, and a lens position control with respect to the first to third group lenses will now be described below.

In the zoom lens in accordance with the present invention, the focal distance is not continuously changed in a stepless manner from a wideangle end to a telephoto end. Instead, the focal distance can be selected in a stepping manner from, e.g., 13 values. After the positions of the first and second lenses have been controlled with the cam ring 5, the third group lenses are put out to a predetermined position to complete the focal distance position control. For the position control of the third group lenses, it is necessary to detect the positions of the first and second lenses with accuracy.

Figure 15:
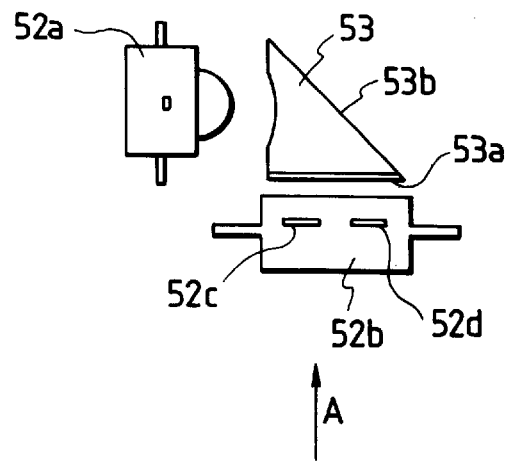
Figure 16:
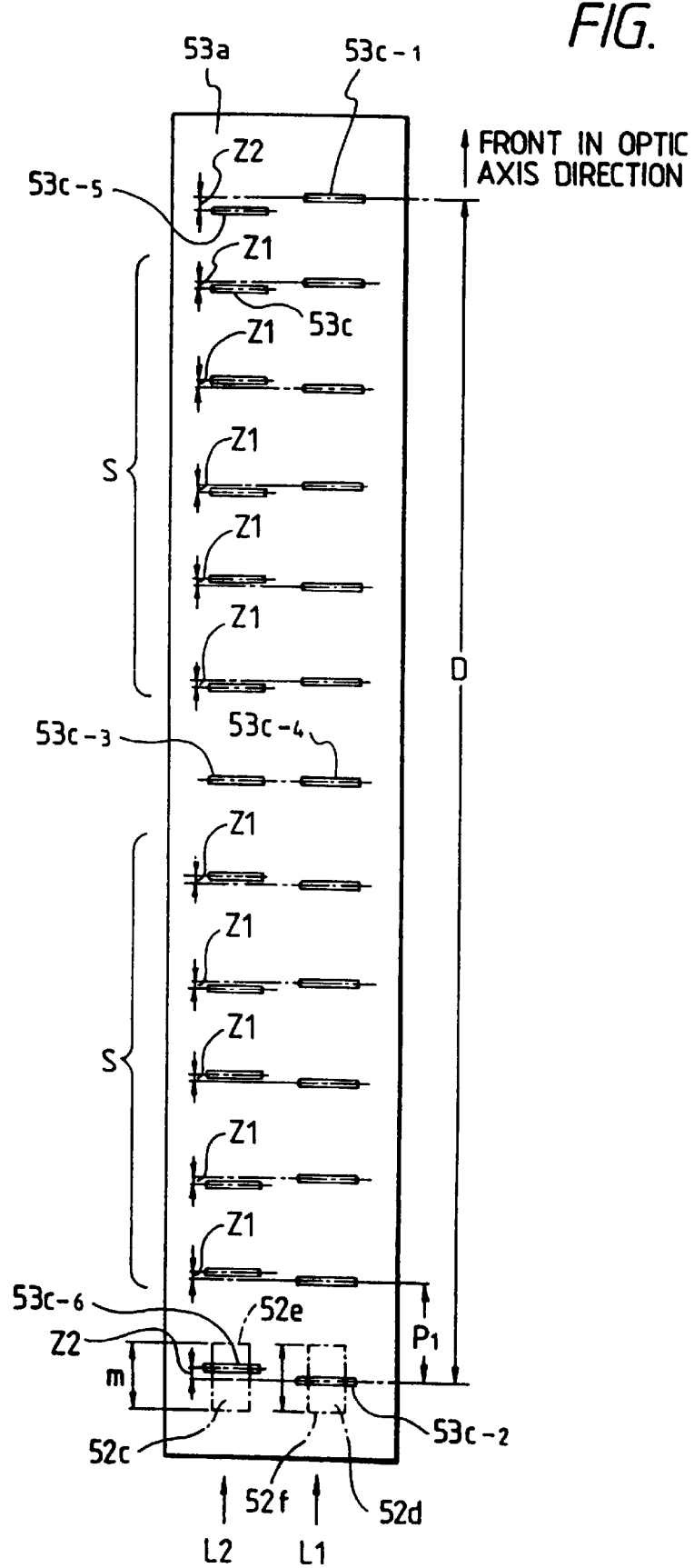

FIGS. 14 to 16 show an example of a lens position detecting apparatus.

A prism 53 extending in the direction along the optical axis is fixed to the first lens group barrel 1. A slit plate 53a such as that shown in FIG. 16 is provided on one side of the prism 53. A component 52 is, for example, a photodetector which is attached to the shutter ground plate 3 to be moved integrally with the second lens group. As shown in FIG. 15, the photodetector 52 is constituted of a device 52a for projecting infrared light to an incidence surface of the prism 53, and a light receiving unit 52b facing the slit plate 53a provided on the emergence side of the prism 53. Infrared light emitted from the projecting device 52a is reflected by a reflecting surface 53b of the prism 53, and only a part of the reflected light passed through slits 53c of the slit plate 53a is projected as slit light onto the light receiving unit 52b.

As shown in FIG. 16, two rows (L1 and L2) of slits are formed in parallel with each other. In correspondence with the rows of slits L1 and L2, two light receiving elements 52c and 52d are provided in the light receiving unit 52b. The projected positions of slit light can be detected with these light receiving elements constituting a position sensing device.

The slit plate 53a is formed so that each slit 53c of the two rows L1 and L2 extends in a direction perpendicular to the optical axis (lens barrel), as shown in FIG. 16. The slits in the row L1 are arranged along the optical axis at equal pitches (pitch P1), and the distance D between the slits 53c-1 and 53c-2 at the opposite ends of the row L1 in the direction along the optical axis is equal to the maximum of the extent of relative movement between the first lens group and the second lens group of this embodiment. The slit spacing (pitch P1) is selected as to be longer than the length of a light receiving surface of the light receiving element 52d in the direction along the optical axis, so that there is no possibility that two beams of slit light passing through adjacent slits are incident upon the light receiving element 52d.

The slits in the row L2 are shifted relative to those in the row L1. It is possible to discriminate the positions of the first and second lens groups (zoom position) by reading the difference between the outputs from the light receiving elements 52c and 52d. The extent to which the slit 53c-3 in the row L2 corresponding to the slit 53c-4 at the center of the row L1 is shifted from the same is zero. Each of the slits in the regions of the row L2 indicated by S, excluding the opposite slits, is shifted relative to the corresponding one of the slits in the row L1 to the same extent Z1, and the directions in which the slits in these regions are shifted relative to the adjacent slits in the row L1 are alternately reversed. The slits at the opposite ends of the row L2 are shifted from the slits 53c-1 and 53c-2 at the opposite ends of the row L1 to an extent Z2, and Z1<Z2.

Figure 30:
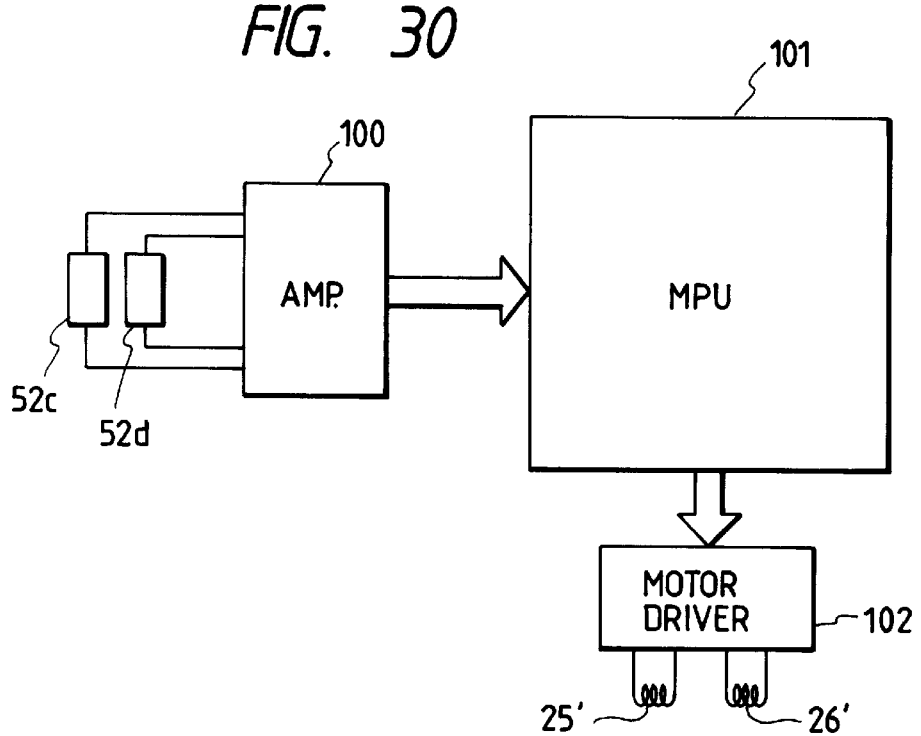

FIG. 30 shows a block diagram of a controller for moving the third lens group to a predetermined position by controlling the stepping motor 190 for driving the third lens group on the basis of detection information from the position sensing device having the light receiving elements 52c and 52d. An amplifier 100 amplifies detection signals from the light receiving elements 52c and 52d. A microcomputer 101 converts the amplified detection signals from the light receiving elements from an analog form to digital form, performs later-described calculations of the signal values, and energizes coils 25' and 26' of the stepping motor 190 through a stepping motor driving circuit 102. The microcomputer 101 is also used as a control means to perform a predetermined operation for driving the first and second lens group. The microcomputer 101 effects the following processing.

Figure 24:
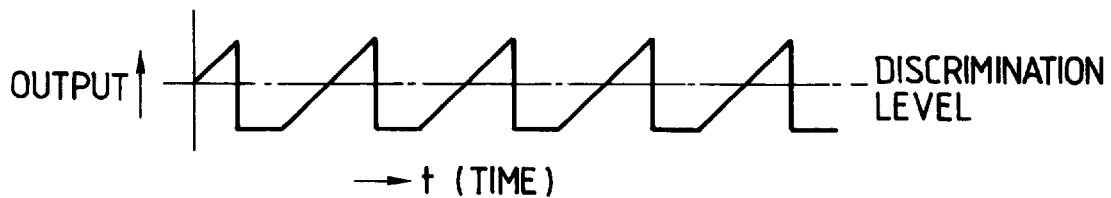
Figure 25:
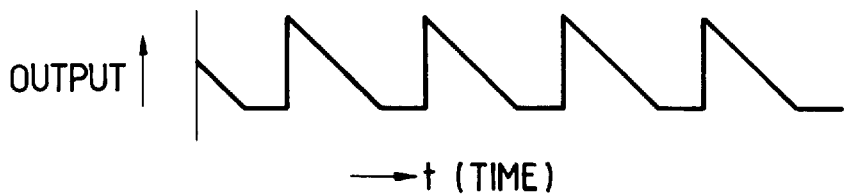
Figure 26:
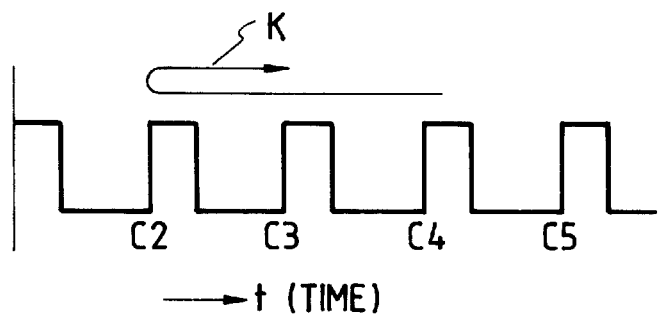
Figure 27:
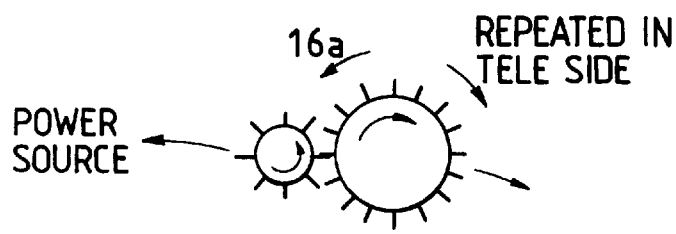

First, a lens position control at the time of zooming from in a WIDE-TELE direction will be described below. The positional relationship between the slit plate 53a and the light receiving elements 52c and 52d shown in FIG. 16 corresponds to a WIDE state shown in the upper section of FIG. 14. When an unillustrated zoom switch of the camera is operated by a photographer to perform zooming to the long focal distance side, the microcomputer 101 discriminates the state of the zoom switch, energizes the infrared light emitting device 52a, and starts discriminating the output from the light receiving element 52d facing the slit row L1. When the gear 8 shown in FIG. 12 starts rotating by receiving power from the unillustrated power source, the above-described zooming operation of the photographing lens system is started; the first group lens barrel 1 is put out to the TELE side while the distance between the first and second lens groups is reduced by the operation of the second group cam ring 2. With this movement, the slit plate 53a (i.e., prism 53) is displaced in the direction of the camera body relative to the light receiving elements 52c and 52d. At this time, waveforms such as those shown in FIGS. 24 and 25 are output from an output terminal 52f of the light receiving element 52d and an output terminal 52e of the element 52c. FIG. 24 shows the signal output from the output from the output terminal 52f, and FIG. 25 shows the signal output from the output terminal 52e. FIG. 26 shows an output from a comparator which compares the output from the output terminal 52f and a discrimination level set to about a half of the maximum value of this output. As the photographer continues maintaining the zoom switch in the on state, the signal output from the comparator rises successively as indicated at C2, C3, . . . , as shown in FIG. 26. In this embodiment, the number of rises of the output is 13, as is apparent from the number of slits in the slit row L1 shown in FIG. 16. If the photographer turns off the zooming switch in this zooming operation, the lens position controller of the camera continues zooming, until the comparator output has the next rising signal $C_n$. When the rising signal $C_n$ is discriminated by the microcomputer, the energization of the drive source is stopped to terminate the zooming operation. In this description, the zooming operation of the camera is explained with respect to extending the lens barrel from a TELE position to a WIDE position. At the time of the operation of retracting the lens barrel from a TELE position to a WIDE position, however, to remove backlash of the mechanism, a control method is used in which after a target stop position, for example, $C_3$ has been passed, next signal $C_2$ is detected and the energization is changed to put out the lens barrel toward the TELE position to stop the lens barrel at $C_3$. The corresponding movement of the lens barrel is schematically indicated by the arrow K in FIG. 26. That is, in accordance with this embodiment, the focal distance is selected in accordance with 13 zoom positions corresponding to $C_1$ to $C_{13}$ irrespective of the zooming direction.

In this embodiment, since, in the slit 53a shown in FIG. 16, the slits 53c-5, 53c-6, and 53c-3 in the row L2 corresponding to the slits 53c-1, 53c-2, and 53c-4 in the row L1 respectively, differ from each other in the extent and the direction of shifting, it is possible to absolutely detect each slit or the zoom position by reading the difference therebetween and the shifting direction from the light receiving elements 52c and 52d. However, with respect to the slits located in the regions S shown in FIG. 16, the extent of shifting is constant although the shifting direction is alternately changed. It is therefore impossible to absolutely detect the corresponding zoom position independently.

With respect to the movement of the lens barrel related to these positions, when the operation of putting out the lens barrel from the retracted state is completed, the WIDE end, i.e., the slits 53c-2 and 53c-6 are positioned so as to face the light receiving elements 52d and 52c, respectively, and the absolute value of this position is read and this position is memorized by the microcomputer. If the lens barrel is stopped in the zooming operation by receiving signal $C_4$ shown in FIG. 26, the zoom position can be recognized since the camera has counted the number of signals $C_n$ generated by zooming. In this state, the zooming is controlled in such a manner that the corresponding slit in the row L2 is read out before photographing and the shifting direction is confirmed. In a case where the photographing lens barrel is shifted form the home position by receiving an external force, as well, it is possible to discriminate adjacent slits and to prevent a position determination error by providing a well-known friction mechanism having a compression spring or the like in the zooming power transmission mechanism. In this case, the gear train of the zooming power transmission mechanism is not moved by the effect of the friction spring since the zoom driving method is such that the zooming is always terminated by energization for putting out the lens barrel to the TELE side as described above, and since the backlash is biased in the direction in which the lens barrel is moved back, i.e., in the direction a in FIG. 16. This means that even if the photographing lens barrel stopped at $C_4$ is pressed rearward to put in the lens barrel to the WIDE side, i.e., to move the lens barrel to the zoom position corresponding to pulse $C_3$, the lens barrel cannot be moved. This effect ensures that even if the lens barrel is moved toward the zoom position corresponding to pulse $C_5$ on the TELE side by play or backlash, the zoom position reached is not the zoom position corresponding to pulse $C_3$.

The above-mentioned friction spring is provided in a position to set an amount of play such that there is no possibility of the lens barrel exceeding the position corresponding to pulse $C_5$ by the play or backlash to stop the zoom position corresponding to pulse $C_6$ (misreading it as the position corresponding to pulse $C_4$), thereby ensuring that the zooming control is free of misreading when the zoom position is shifted by an external force or the like. Further, the difference between shifts Z1 and Z2 shown in FIG. 16 relative to the slits in the row L1 is maximized with respect to a restricted range of sensor length m to reduce the number of shifts for zoom position discrimination and to thereby prevent the sensor from misreading itself.

Figure 28:
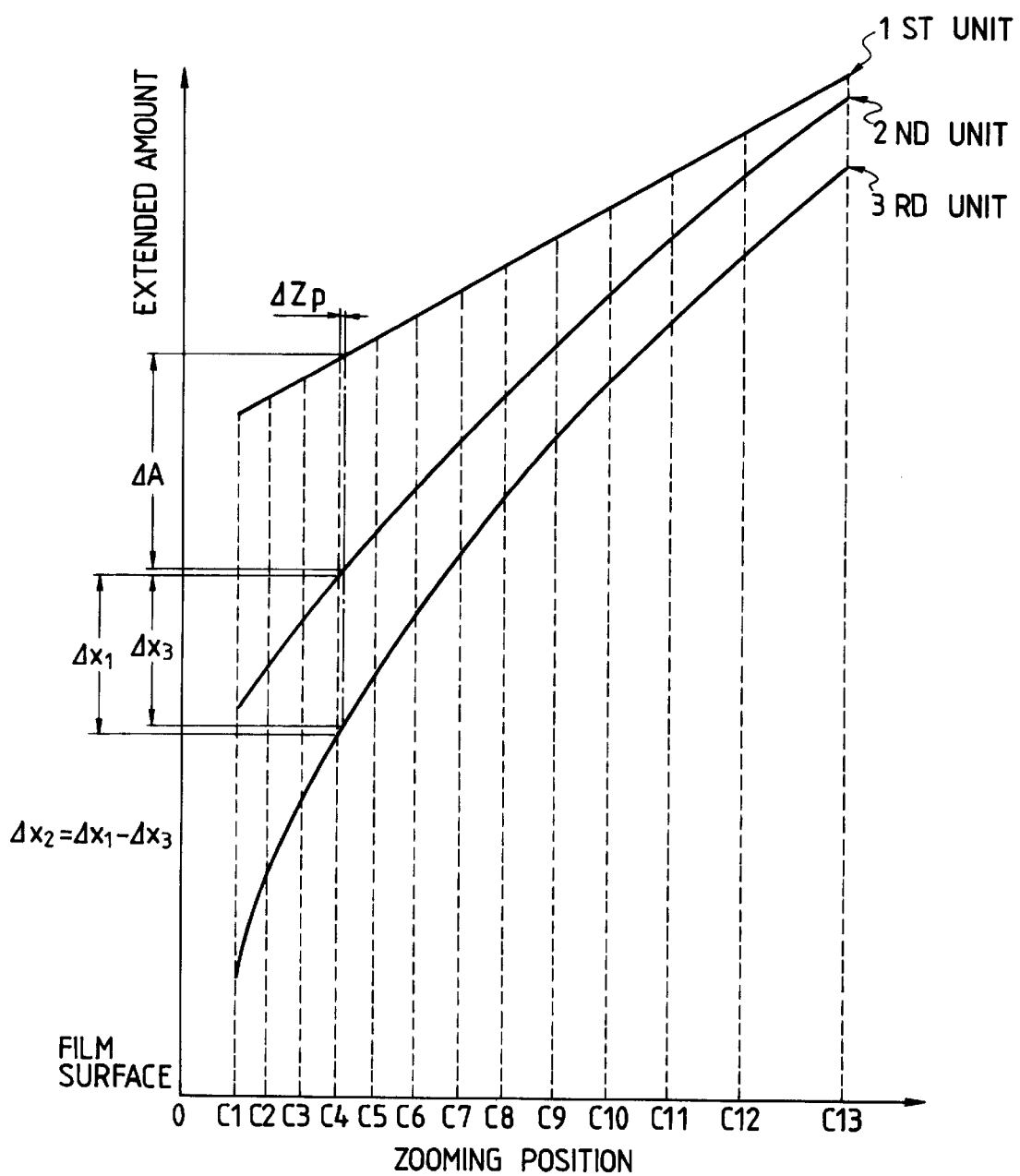
Figure 29:
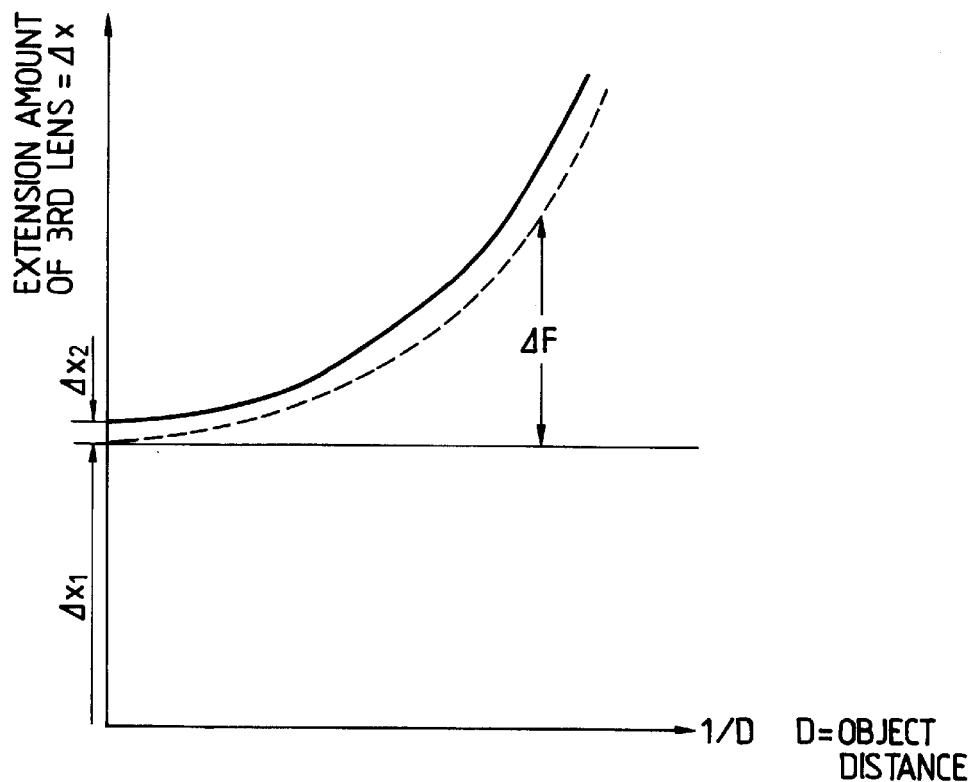

FIG. 28 is a graph showing the extent to which each lens group is put out by zooming. Each of the positions indicated by broken lines in FIG. 28 represents a position at which infrared light passing through the corresponding slit in the row L1 shown in FIG. 16 reaches the center of the light receiving element 52d. Each position corresponds to the time at which pulse $C_n$ shown in FIG. 26 is issued since the discrimination level shown in FIG. 24 is set to ½ of the output from the light receiving element. It is assumed here that when pulse $C_4$ is detected to terminate zooming, the lens barrel is stopped at a position indicated by a double-dot-dash line in FIG. 28, i.e., a position slightly shifted relative to the center of the light receiving element 52d facing the row L1. At this time, the third group lens is moved by $\Delta x_1$ toward the camera body by the stepping motor by assuming that the photographing lens barrel is stopped at the position indicated by the broken line ($C_4$) in FIG. 28, that is, the line of slit light is located at the center of the light receiving element 52d. FIG. 29 shows the relationship between the distance to the subject and the extent of movement $\Delta x$ of the third group lenses. In FIG. 29, $\Delta x_1$ represents a reference distance between the second and third group lenses and corresponds to the infinity focusing position at the time of stoppage at the zoom position center. This value is expressed by a function of zoom positions $C_1$ to $C_{13}$.

$\Delta F$ represents the extent of movement corresponding to a reciprocal of the subject distance D and is expressed by a function 1/D and zoom positions $C_1$ to $C_{13}$.

$\Delta x_2$ represents the amount of correction with respect to stop position deviation $\Delta Zp$, and is expressed by a function $\Delta Zp$ and zoom positions $C_1$ to $C_{13}$.

Therefore the total extent of movement $\Delta x$ of the third group lenses is given as $$\Delta x = \Delta x_1 (C_n) + \Delta F (C_n, 1/D) + \Delta x_2 (C_n, \Delta Zp)$$

and is calculated by the microcomputer.

Figure 31:
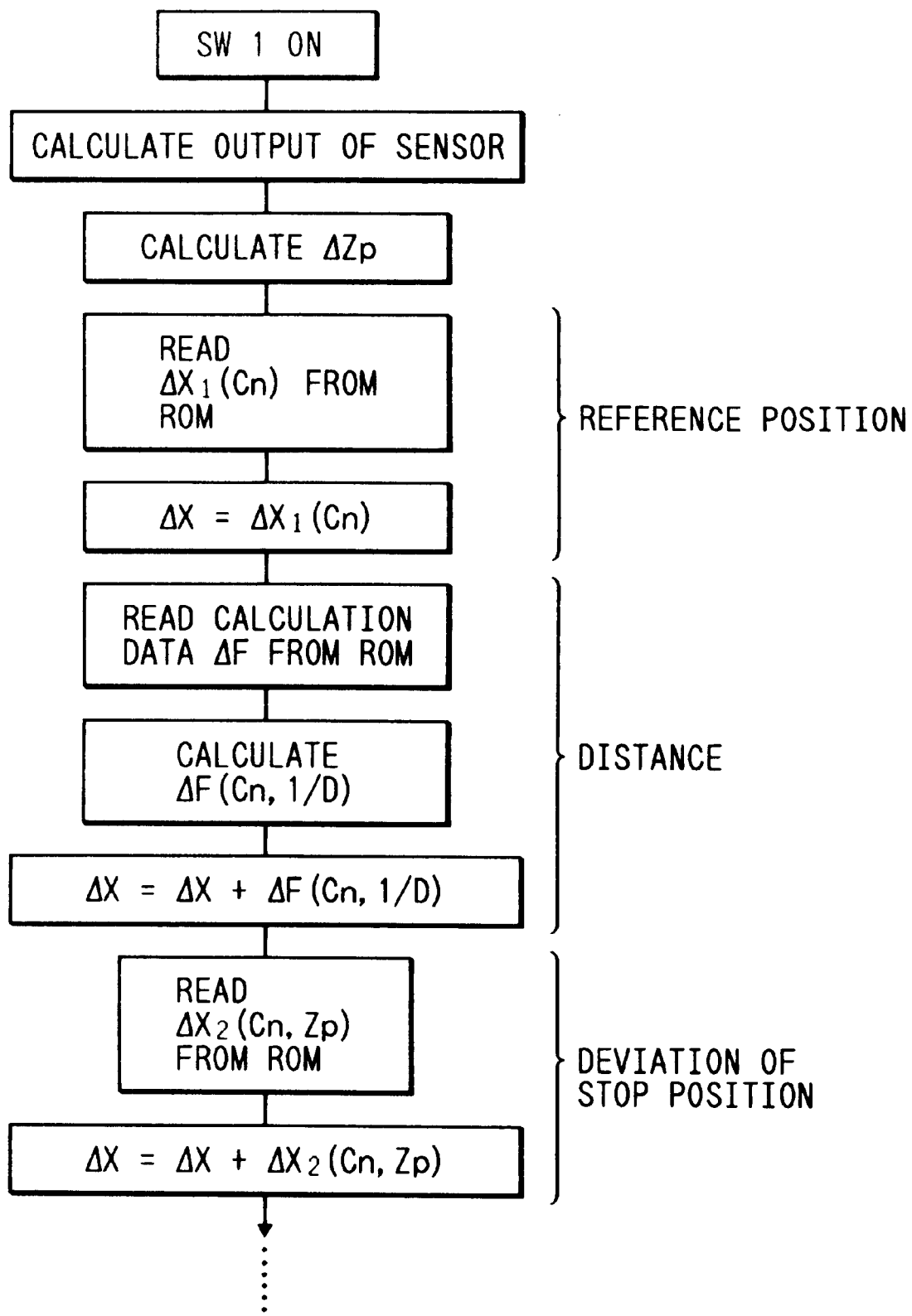

An example of a calculation procedure will be described below with reference to FIG. 31. When a first stroke switch SW1 is turned on by pressing an unillustrated shutter button, the microcomputer 101 calculates the extent of deviation $\Delta Zp$ of the stopped position from the center from the outputs from the light receiving elements 52c and 52d. Since the zoom position is known, the reference extent of movement $\Delta x_1$ of the third group lenses corresponding to the zoom position is read from a ROM of the microcomputer and is set as $\Delta x$.

Next, the distance to a subject is measured by a distance metering means which is known per se, information on $\Delta F$ is read from the ROM of the microcomputer 101 based on the information on 1/D, and ($\Delta x + \Delta F$) is set as $\Delta x$. Also, information on $\Delta x_2$ is read from the ROM of the microcomputer 101 based on the information on the extent of deviation $\Delta Zp$, and $\Delta x + \Delta x_2$ is set as $\Delta x$. By this processing, $\Delta x = \Delta x_1 + \Delta F + \Delta x_2$ is obtained, thus calculating the extent of movement of the third group lenses.

When the shutter button is pressed to turn on a second release switch SW2, the third group lenses are moved to the extent based on this $\Delta x$ by the stepping motor. After the shutter opening/closing operation and the film winding operation have been completed, the third group lenses are returned to the position corresponding to $\Delta x_1$ (i.e., the initial position).

Figure 32:
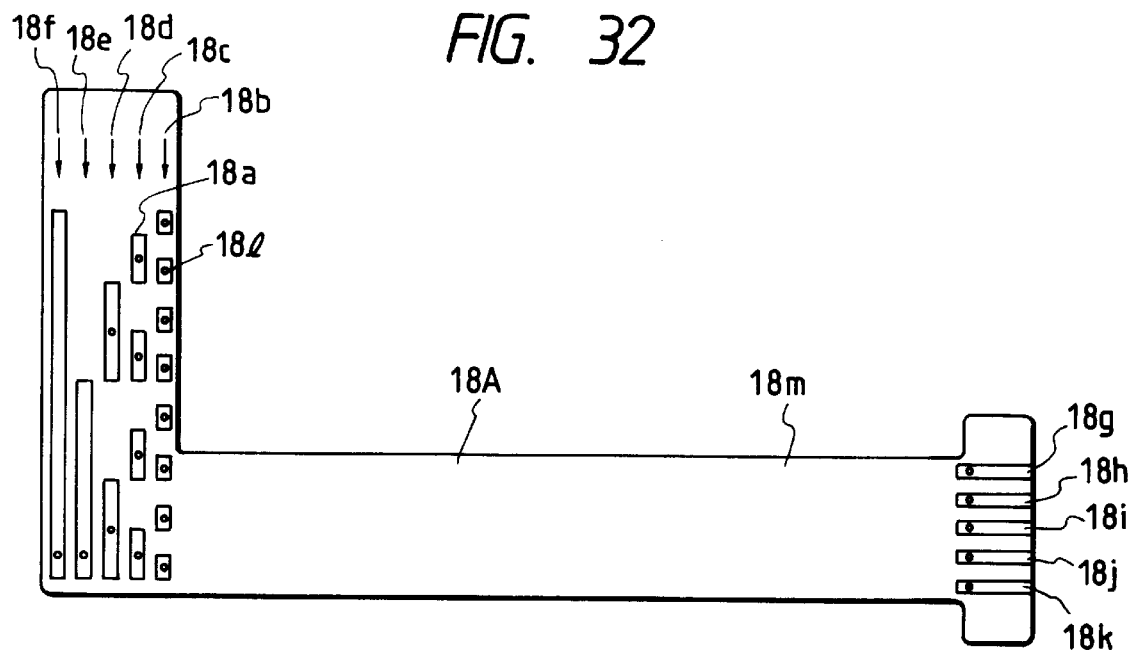
FIG. 32 is a plan view of a flexible printed circuit board in accordance with the second embodiment.
Figure 33:
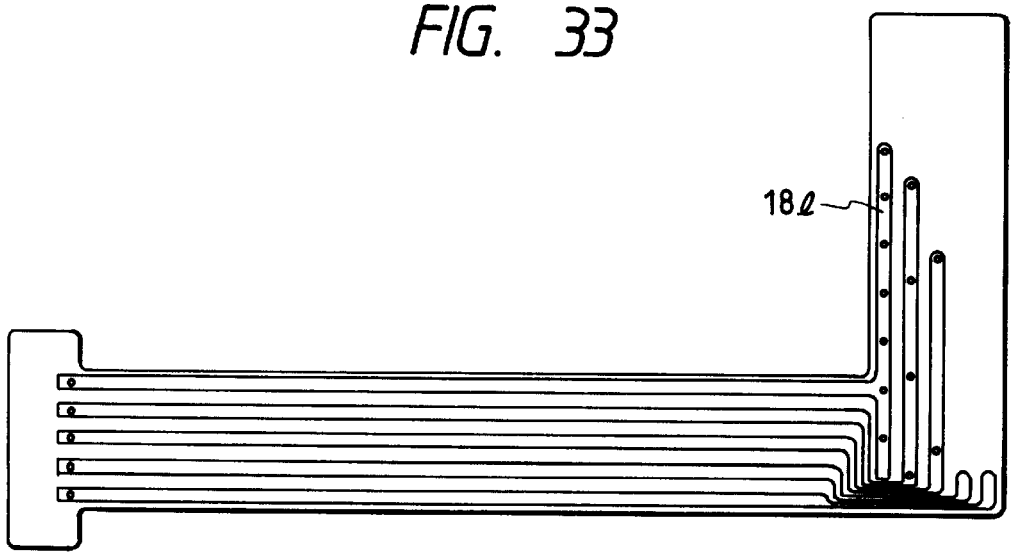
FIG. 33 is a diagram of a reverse side of the flexible printed circuit board shown in FIG. 32.

In the above-described embodiment, zoom position discrimination may be effected by using a zoom position discriminating flexible printed circuit board, such as that shown in FIG. 32, while removing the slit row L2 shown in FIG. 16 and the light receiving element 52c. The same effect can also be obtained by using such a means. That is, the arrangement may be such that zoom position detection is performed inside the lens barrel.

Figure 34:
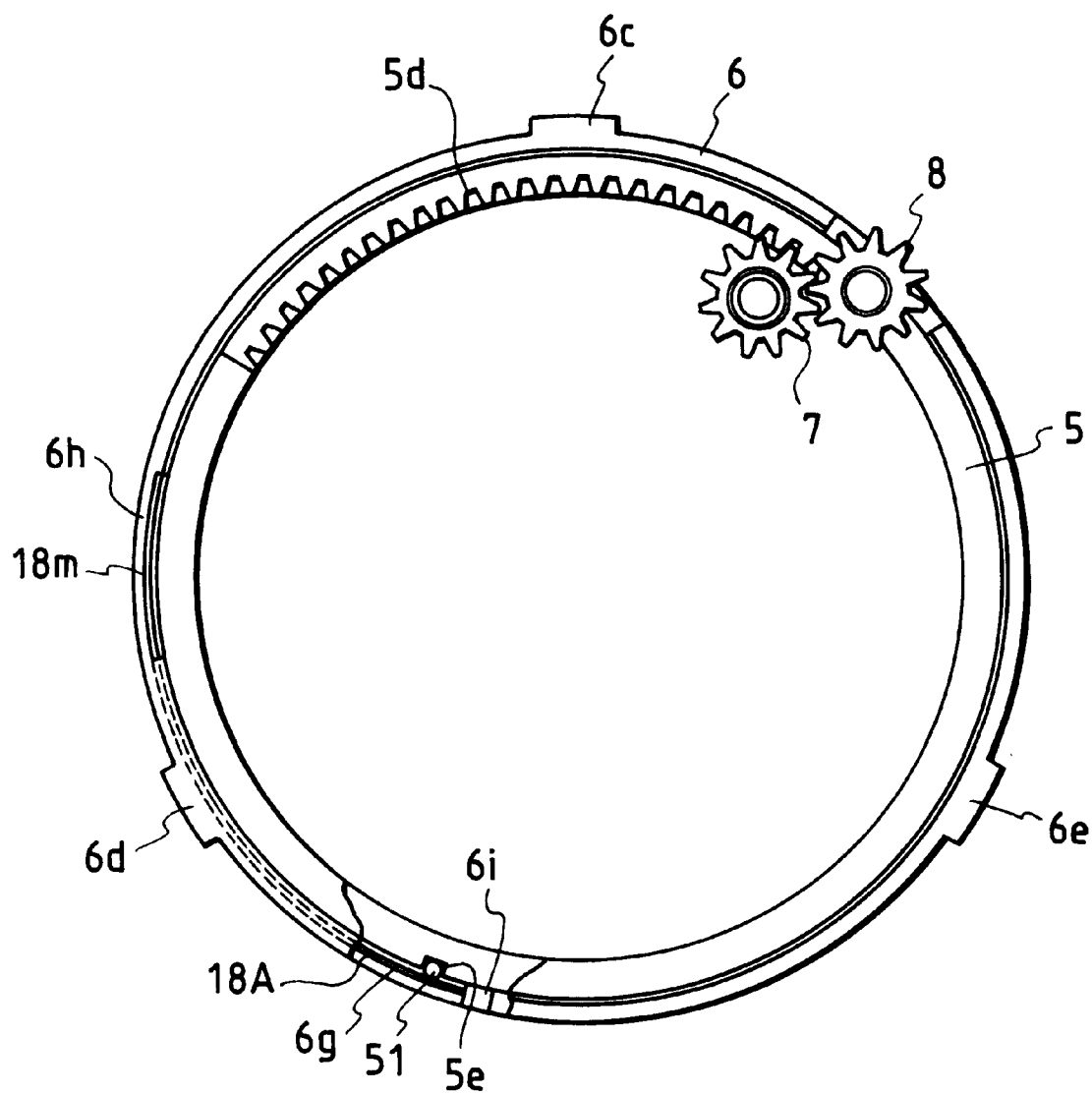
FIG. 34 is a diagram of a state in which the flexible printed circuit board shown in FIG. 32 is set in the lens barrel.

FIG. 32 shows a well-known zoom position detecting flexible printed circuit board 18A having patterns for zoom position discrimination, e.g., patterns 18a formed on its surface. Rows of patterns 18b to 18e are connected by reverse side patterns and through holes 18l to output their conductive states to patterns 18g to 18j, as shown in FIG. 32. A pattern 18f is connected to a pattern 18k in the case manner to enable the potential on each of the rows of patterns 18b to 18e to be reduced to the ground level. FIG. 34 shows a rear view of portions of the zoom lens having the flexible board 18A is mounted in the lens barrel. The zoom position detecting flexible board 18A is fixed on a counter-bored portion 6g of straight-drive guide 6 by a well-known means such as an adhesive double coated tape. A coil spring 5e formed of, for example, an electroconductive material is provided on an outer circumferential portion of cam ring 5. The coil spring 5e rotates integrally with the cam ring 5 and slides on the pattern surface of the flexible board 18A to discriminate the extent of rotation of the cam ring 5 based on the conductive state of the corresponding pattern on the zoom position detecting flexible board.

A signal pick-up portion 18m of the flexible board is led out from an inner counter-bored portion 6h of the straight-drive guide shown in FIG. 34 to be connected to the microcomputer in the camera body by a well-known means. By this arrangement, the zoom position is discriminated based on the conduction between each pattern of the flexible board 18A and the coil spring 5e, and the position of the lens barrel, i.e., the focal distance is detected with accuracy by the slits and the light receiving element, thereby achieving an object of the present invention.

In accordance with the second embodiment, as described above, a lens barrel construction is adopted in which a detection member for accurately reading the distance between the first and second lens groups in the photographing lens barrel, and in which the third lens group capable of moving independently of the first and second groups is driven based on distance reading data. It is thereby possible to realize a low-cost collapsible barrel mechanism in a small space and to minimize the air spacings between the lenses while increasing the extent to which the lenses are retracted into the body.

What is claimed is:

1. A camera comprising:

a lens barrel collapsing drive mechanism for putting out a lens barrel including a zoom operation member for operating a plurality of lenses for zooming by controlling the positions of the lenses from a collapsed position to a photographing waiting position in front of a camera body;

a bayonet member for positioning and retaining the lens barrel on the camera body, said bayonet member being mounted on the camera body so as to be rotatable about an optical axis;

a zoom driving force transmission mechanism for transmitting a zoom driving force to said zoom operation member by connecting an input gear for transmitting a driving force to said zoom operation member provided on the lens barrel and an output gear provided on the camera body;

an input gear rotation inhibition member capable of engaging with the input gear while the input gear is moved to a position immediately before a position at which the input gear is connected to the output gear, said input gear rotation inhibition member being provided on the camera body; and a lock member for positioning and retaining the lens barrel in the photographing waiting position and for releasing the lens barrel from the positioned and retained state, said lock member being engaged or disengaged, respectively, with the output gear by an operation of rotating said bayonet member to inhibit or allow the rotation of the output gear.

2. An apparatus comprising:

a movable optical unit;

a first driving force transmission system moving in accordance with a movement of said optical unit;

a second driving force transmission system being in a contact state or a non-contact state with said first driving force transmission system in response to a movement of said first driving force transmission system; and fixing means for fixing a phase of said first and second driving force transmission systems to a phase corresponding to a time when said first and second driving force transmission systems come into the non-contact state, after said first and second driving force transmission systems come into the non-contact state.

3. An apparatus according to claim 2, wherein said first and second driving force transmission systems comprise gears.

4. An apparatus according to claim 2, wherein said second driving force transmission system is provided in a camera body.

5. An apparatus according to claim 2, wherein said optical unit comprises means for changing magnification.

6. An apparatus according to claim 5, wherein said optical unit comprises means for collapse.

7. An apparatus according to claim 2, wherein said optical unit comprises means for collapse.

8. An apparatus according to claim 2, wherein said optical unit comprises means for changing magnification by a driving force which is transmitted by connecting said first driving force transmission system to said second driving force transmission system.

9. An apparatus according to claim 2, further comprising guiding means for guiding the movement of said optical unit along an optical axis.

10. An apparatus comprising:

a first optical unit;

a second optical unit;

a motor which moves said second optical unit relative to said first optical unit;

a moving device which moves said first optical unit, said second optical unit and said motor as a unit in parallel with an optical axis of the apparatus; and a determination device that determines a position to which said second optical unit is moved by said motor in accordance with a stop position where said first optical unit moved by said moving device is stopped.

11. An apparatus according to claim 10, wherein said determination device comprises a detector which detects a difference of the movement positions between said first and second optical units.

12. An apparatus according to claim 10, wherein said determination device comprises an optical detector.

13. An apparatus according to claim 10, wherein said determination device comprises a non-contact detector.

14. An apparatus according to claim 10, wherein said determination device comprises a position sensor.

15. An apparatus according to claim 10, wherein said determination device comprises:

a first detection row disposed in such a manner that a plurality of detection portions are arranged along at least one of the movement directions of said first and second optical units;

a second detection row disposed in such a manner that a plurality of detection portions are arranged along at least one of the movement directions of said first and second optical units; and wherein said determination device determines at least one of the positions of said first and second optical units by a combination of said first and second detection rows.

16. An apparatus according to claim 15, wherein said determination device comprises means for detecting a shift direction of said detection portion of said second detection row with respect to said detection portion of said first detection row.

17. An apparatus according to claim 16, wherein said determination device comprises means for detecting a shift amount of said detection portion of said second detection row with respect to said detection portion of said first detection row.

18. An apparatus according to claim 15, wherein said determination device comprises means for detecting a shift amount of said detection portion of said second detection row with respect to said detection portion of said first detection row.

19. An apparatus according to claim 15, wherein said determination device comprises a first region for detecting a shift direction of said detection portion of said second detection row with respect to said detection portion of said first detection row, and comprises a second region for detecting a shift amount of said detection portion of said second detection row with respect to said detection portion of said first detection row.

20. An apparatus according to claim 15, wherein said determination device comprises a first region for detecting a shift direction of said detection portion of said second detection row with respect to said detection portion of said first detection row, and comprises a second region for detecting a shift direction and a shift amount of said detection portion of said second detection row with respect to said detection portion of said first detection row.

21. An apparatus according to claim 15, wherein said determination device comprises a region disposed so as to alternately change shift directions of said detection portion of said second detection row with respect to said detection portion of said first detection row.

22. An apparatus according to claim 21, wherein said determination device comprises a region disposed so as to alternately change shift directions of said detection portion of said second detection row with respect to said detection portion of said first detection row, while a shift amount remains constant.

23. An apparatus according to claim 22, wherein said determination device comprises a region disposed so as to change shift directions and a shift amount of said detection portion of said second detection row with respect to said detection portion of said first detection row.

24. An apparatus according to claim 10, wherein said motor comprises a stepping motor.

25. An apparatus according to claim 10, wherein said first optical unit comprises a lens for changing magnification.

26. An apparatus according to claim 25, wherein said second optical unit comprises a lens for adjusting focus.

27. An apparatus according to claim 25, wherein said second optical unit comprises a lens for adjusting focus and changing magnification.

28. An apparatus according to claim 10, wherein said second optical unit comprises a lens for adjusting focus.

29. An apparatus according to claim 10, wherein said second optical unit comprises a lens for adjusting focus and changing magnification.

30. An apparatus according to claim 10, wherein said moving device moves said first optical unit so as to change magnification.

31. An apparatus according to claim 30, wherein said motor moves said second optical unit so as to adjust focus.

32. An apparatus according to claim 30, wherein said motor moves said second optical unit so as to adjust focus and change magnification.

33. An apparatus according to claim 10, wherein said motor moves said second optical unit so as to adjust focus.

34. An apparatus according to claim 10, wherein said motor moves said second optical unit so as to adjust focus and change magnification.

35. An apparatus according to claim 10, further comprising:
a third optical unit that changes magnification by varying an interval relative to said first optical unit moved by said moving device.

36. An apparatus according to claim 10, wherein said determination device determines the position to which said second optical unit is moved by said motor in accordance with an actual stop position of said first optical unit moved by said moving device.

37. An apparatus according to claim 10, wherein said determination device comprises a detector that detects an actual stop position of said first optical unit moved by said moving device.

38. An apparatus according to claim 10, wherein said motor starts to move said second optical unit in response to a shutter release member.

39. An apparatus according to claim 10, wherein said motor starts to move said second optical unit so as to adjust focus in response to a shutter release member.

40. An apparatus according to claim 10, wherein said motor starts to move said second optical unit so as to adjust focus and change magnification in response to a shutter release member.

41. An apparatus according to claim 10, wherein said motor moves said second optical unit so as to adjust focus in accordance with focusing information on an object.

42. An apparatus according to claim 10, wherein said motor starts to move said second optical unit so as to adjust focus in accordance with focusing information on an object in response to a shutter release member.

43. An apparatus according to claim 10, further comprising:
a detector that detects focusing information on an object in response to a first stroke of a shutter release member,
wherein said motor starts to move said second optical unit so as to adjust focus in accordance with the focusing information in response to a second stroke of the shutter release member.

44. An apparatus according to claim 10, wherein said moving device is driven by a drive source.

45. An apparatus according to claim 10, wherein said first and second optical unit establish a zoom optical system.

46. An apparatus according to claim 10, wherein said motor moves said second optical unit in parallel with the optical axis.

47. An apparatus according to claim 10, wherein said moving device comprises a cam device that moves said first optical unit.

48. An apparatus according to claim 47, further comprising:
a screw device that moves said second optical unit, said screw device being driven by said motor.

49. An apparatus according to claim 10, further comprising:
a screw device that moves said second optical unit, said screw device being driven by said motor.

50. An apparatus according to claim 10, further comprising:
a shutter unit held by said first optical unit.

51. An apparatus according to claim 10, further comprising:
an elastic member that urges said first optical unit in a predetermined direction.

52. An apparatus according to claim 10, further comprising:
an elastic member that urges said second optical unit in a predetermined direction.

53. An apparatus according to claim 10, wherein said first and second optical unit establish a zoom photographic optical system.

54. A camera comprising:
a movable optical unit;
a first driving force transmission system moving in accordance with a movement of said optical unit;
a second driving force transmission system being in a contact state or a non-contact state with said first driving force transmission system in response to a movement of said first driving force transmission system; and
fixing means for fixing a phase of said first and second driving force transmission systems to a phase corresponding to a time when said first and second driving force transmission systems come into the non-contact state, after said first and second driving force transmission systems come into the non-contact state.

55. A camera comprising:
a first optical unit;
a second optical unit;
a motor which moves said second optical unit relative to said first optical unit;
a moving device which moves said first optical unit, said second optical unit and said motor as a unit in parallel with an optical axis; and
a determination device that determines a position to which said second optical unit is moved by said motor in accordance with a stop position where said first optical unit moved by said moving device is stopped.

56. A camera according to claim 55, wherein said first optical unit comprises a lens for changing focal length.

57. A camera according to claim 56, wherein said second optical unit comprises a lens for adjusting focus.

58. A camera according to claim 56, wherein said second optical unit comprises a lens for adjusting focus and changing focal length.

59. A camera according to claim 55, wherein said second optical unit comprises a lens for adjusting focus.

60. A camera according to claim 55, wherein said second optical unit comprises a lens for adjusting focus and changing focal length.

61. A camera according to claim 55, wherein said moving device moves said first optical unit so as to change focal length.

62. A camera according to claim 61, wherein said motor moves said second optical unit so as to adjust focus.

63. A camera according to claim 61, wherein said motor moves said second optical unit so as to adjust focus and change focal length.

64. A camera according to claim 55, wherein said motor moves said second optical unit so as to adjust focus.

65. A camera according to claim 55, wherein said motor moves said second optical unit so as to adjust focus and change focal length.

66. A camera according to claim 55, further comprising:
a third optical unit that changes focal length by varying an interval relative to said first optical unit moved by said moving device.

67. A camera according to claim 55, wherein said determination device determines the position to which said second optical unit is moved by said motor in accordance with an actual stop position of said first optical unit moved by said moving device.

68. A camera according to claim 55, wherein said determination device comprises a detector that detects an actual stop position of said first optical unit moved by said moving device.

69. A camera according to claim 55, wherein said motor starts to move said second optical unit in response to a shutter release member.

70. A camera according to claim 55, wherein said motor starts to move said second optical unit so as to adjust focus in response to a shutter release member.

71. A camera according to claim 55, wherein said motor starts to move said second optical unit so as to adjust focus and change focal length in response to a shutter release member.

72. A camera according to claim 55, wherein said motor moves said second optical unit so as to adjust focus in accordance with focusing information on an object.

73. A camera according to claim 55, wherein said motor starts to move said second optical unit so as to adjust focus in accordance with focusing information on an object in response to a shutter release member.

74. A camera according to claim 55, further comprising:
a detector that detects focusing information on an object in response to a first stroke of a shutter release member,
wherein said motor starts to move said second optical unit so as to adjust focus in accordance with the focusing information in response to a second stroke of the shutter release member.

75. A camera according to claim 55, wherein said moving device is driven by a drive source.

76. A camera according to claim 55, wherein said first and second optical unit establish a zoom optical system.

77. A camera according to claim 55, wherein said motor moves said second optical unit in parallel with the optical axis.

78. A camera according to claim 55, wherein said moving device comprises a cam device that moves said first optical unit.

79. A camera according to claim 78, further comprising:
a screw device that moves said second optical unit, said screw device being driven by said motor.

80. A camera according to claim 55, further comprising:
a screw device that moves said second optical unit, said screw device being driven by said motor.

81. A camera according to claim 55, further comprising:
a shutter unit held by said first optical unit.

82. A camera according to claim 55, further comprising:
an elastic member that urges said first optical unit in a predetermined direction.

83. A camera according to claim 55, further comprising:
an elastic member that urges said second optical unit in a predetermined direction.

84. A camera according to claim 55, wherein said motor comprises a stepping motor.

85. An apparatus comprising:
a first optical unit;
a second optical unit;
a motor which moves said second optical unit relative to said first optical unit;
a moving device which moves said first optical unit, said second optical unit, and said motor as a unit in parallel with an optical axis;
a determination device which determines a stop position where said first optical unit moved by said moving device is stopped,
wherein said second optical unit moved by said motor is stopped in accordance with the stop position determined by said determination device.

86. An apparatus according to claim 85, wherein said moving device moves said first optical unit so as to change magnification.

87. An apparatus according to claim 86, wherein said motor moves said second optical unit so as to adjust focus.

88. An apparatus according to claim 86, wherein said motor moves said second optical unit so as to adjust focus and change magnification.

89. An apparatus according to claim 85, wherein said motor moves said second optical unit so as to adjust focus.

90. An apparatus according to claim 85, wherein said motor moves said second optical unit so as to adjust focus and change magnification.

91. An apparatus according to claim 85, wherein said motor moves said second optical unit so as to adjust focus in accordance with focusing information on an object.

92. An apparatus according to claim 85, wherein said first and second optical unit establish a zoom optical system.

93. An apparatus according to claim 85, wherein said motor moves said second optical unit in parallel with the optical axis.

94. An apparatus according to claim 85, wherein said first optical unit and said second optical unit establish a zoom photographic optical system.

95. An apparatus to claim 85, wherein said motor comprises a stepping motor.

96. A camera comprising:
a first optical unit;
a second optical unit;
a motor which moves said second optical unit relative to said first optical unit;
a moving device which moves said first optical unit, said second optical unit, and said motor as a unit in parallel with an optical axis; and
a determination device which determines a stop position where said first optical unit moved by said moving device is stopped,
wherein said second optical unit moved by said motor is stopped in accordance with the stop position determined by said determination device.

97. A camera according to claim 96, wherein said moving device moves said first optical unit so as to change focal length.

98. A camera according to claim 97, wherein said motor moves said second optical unit so as to adjust focus.

99. A camera according to claim 97, wherein said motor moves said second optical unit so as to adjust focus and change focal length.

100. A camera according to claim 96, wherein said motor moves said second optical unit so as to adjust focus.

101. A camera according to claim 96, wherein said motor moves said second optical unit so as to adjust focus and change focal length.

102. A camera according to claim 96, wherein said motor starts to move said second optical unit in response to a shutter release member.

103. A camera according to claim 96, wherein said motor starts to move said second optical unit so as to adjust focus in response to a shutter release member.

104. A camera according to claim 96, wherein said motor starts to move said second optical unit so as to adjust focus and change focal length in response to a shutter release member.

105. A camera according to claim 96, wherein said motor moves said second optical unit so as to adjust focus in accordance with focusing information on an object.

106. A camera according to claim 96, wherein said motor starts to move said second optical unit so as to adjust focus in accordance with focusing information on an object in response to a shutter release member.

107. A camera according to claim 96, further comprising:
a detector that detects focusing information on an object in response to a first stroke of a shutter release member,
wherein said motor starts to move said second optical unit so as to adjust focus in accordance with the focusing information in response to a second stroke of the shutter release member.

108. A camera according to claim 96, wherein said first optical unit and said second optical unit establish a zoom optical system.

109. A camera according to claim 96, wherein said motor moves said second optical unit in parallel with the optical axis.

110. A camera according to claim 96, wherein said motor comprises a stepping motor.

111. An apparatus comprising:
a first optical unit;
a second optical unit held by said first optical unit;
a motor that moves said second optical unit relative to said first optical unit, said motor being held by said first optical unit;
a moving device that moves said first optical unit, said second optical unit, and said motor as a unit in parallel with an optical axis by driving said first optical unit; and
a determination device that determines a position to which said second optical unit is moved by said motor in accordance with a stop position where said first optical unit moved by said moving device is stopped.

112. An apparatus according to claim 111, wherein said moving device moves said first optical unit so as to change magnification.

113. An apparatus according to claim 112, wherein said motor moves said second optical unit so as to adjust focus.

114. An apparatus according to claim 112, wherein said motor moves said second optical unit so as to adjust focus and change magnification.

115. An apparatus according to claim 111, wherein said motor moves said second optical unit so as to adjust focus.

116. An apparatus according to claim 111, wherein said motor moves said second optical unit so as to adjust focus and change magnification.

117. An apparatus according to claim 111, wherein said motor moves said second optical unit so as to adjust focus in accordance with focusing information on an object.

118. An apparatus according to claim 111, wherein said first optical unit and said second optical unit establish a zoom optical system.

119. An apparatus according to claim 111, wherein said motor moves said second optical unit in parallel with the optical axis.

120. An apparatus according to claim 111, wherein said first optical unit and said second optical unit establish a zoom photographic optical system.

121. An apparatus to claim 111, wherein said motor comprises a stepping motor.

122. A camera comprising:
a first optical unit;
a second optical unit held by said first optical unit;
a motor that moves said second optical unit relative to said first optical unit, said motor being held by said first optical unit;
a moving device that moves said first optical unit, said second optical unit, and said motor as a unit in parallel with an optical axis by driving said first optical unit; and
a determination device that determines a position to which said second optical unit is moved by said motor in accordance with a stop position where said first optical unit moved by said moving device is stopped.

123. A camera according to claim 122, wherein said moving device moves said first optical unit so as to change focal length.

124. A camera according to claim 123, wherein said motor moves said second optical unit so as to adjust focus.

125. A camera according to claim 123, wherein said motor moves said second optical unit so as to adjust focus and change focal length.

126. A camera according to claim 122, wherein said motor moves said second optical unit so as to adjust focus.

127. A camera according to claim 122, wherein said motor moves said second optical unit so as to adjust focus and change focal length.

128. A camera according to claim 122, wherein said motor starts to move said second optical unit in response to operation of a shutter release member.

129. A camera according to claim 122, wherein said motor starts to move said second optical unit so as to adjust focus in response to operation of a shutter release member.

130. A camera according to claim 122, wherein said motor starts to move said second optical unit so as to adjust focus and change focal length in response to operation of a shutter release member.

131. A camera according to claim 122, wherein said motor moves said second optical unit so as to adjust focus in accordance with focusing information on an object.

132. A camera according to claim 122, wherein said motor starts to move said second optical unit so as to adjust focus in accordance with focusing information on an object in response to operation of a shutter release member.

133. A camera according to claim 122, further comprising:
a detector that detects focusing information on an object in response to a first stroke of a shutter release member,
wherein said motor starts to move said second optical unit so as to adjust focus in accordance with the focusing information in response to a second stroke of the shutter release member.

134. A camera according to claim 122, wherein said first optical unit and said second optical unit establish a zoom optical system.

135. A camera according to claim 122, wherein said motor moves said second optical unit in parallel with the optical axis.

136. A camera according to claim 122, wherein said motor comprises a stepping motor.

137. An apparatus comprising:

a first optical unit;

a second optical unit held by said first optical unit;

a motor that moves said second optical unit relative to said first optical unit, said motor being held by said first optical unit;

a moving device which moves said first optical unit, said second optical unit, and said motor as a unit in parallel with an optical axis; and a determination device which determines a stop position where said first optical unit moved by said moving device is stopped, wherein said second optical unit moved by said motor is stopped in accordance with the stop position determined by said determination device.

138. An apparatus according to claim 137, wherein said moving device moves said first optical unit so as to change magnification.

139. An apparatus according to claim 137, wherein said motor moves said second optical unit so as to adjust focus.

140. An apparatus according to claim 137, wherein said motor moves said second optical unit so as to adjust focus in accordance with focusing information on an object.

141. An apparatus according to claim 137, wherein said motor moves said second optical unit in parallel with the optical axis.

142. An apparatus according to claim 137, wherein said first optical unit and said second optical unit establish a zoom optical system.

143. A camera comprising:

a first optical unit;

a second optical unit held by said first optical unit;

a motor that moves said second optical unit relative to said first optical unit, said motor being held by said first optical unit;

a moving device which moves said first optical unit, said second optical unit, and said motor as a unit in parallel with an optical axis; and a determination device which determines a stop position where said first optical unit moved by said moving device is stopped, wherein said second optical unit moved by said motor is stopped in accordance with the stop position determined by said determination device.

144. A camera according to claim 143, wherein said moving device moves said first optical unit so as to change focal length.

145. A camera according to claim 143, wherein said motor moves said second optical unit so as to adjust focus.

146. A camera according to claim 143, wherein said motor starts to move said second optical unit in response to operation of a shutter release member.

147. A camera according to claim 143, wherein said motor moves said second optical unit so as to adjust focus in accordance with focusing information on an object.

148. A camera according to claim 143, wherein said motor starts to move said second optical unit so as to adjust focus in accordance with focusing information on an object in response to operation of a shutter release member.

149. A camera according to claim 143, wherein said first optical unit and said second optical unit establish a zoom optical system.

150. A camera according to claim 143, wherein said motor moves said second optical unit in parallel with the optical axis.

* * * * *

UNITED STATES PATENT AND TRADEMARK OFFICE
CERTIFICATE OF CORRECTION

PATENT NO. : 5,950,021

DATED : September 7, 1999

INVENTOR(S): RYOICHI SUZUKI, ET AL.

It is certified that error appears in the above-identified patent and that said Letters Patent is hereby corrected as shown below:

COLUMN 2:

Line 4, "an" should be deleted.
    Line 45, "is" should read --it is--.

Column 9:

Line 36, "is increased" should be deleted.

Column 13:

Line 59, "alone" should read --along--.

COLUMN 14:

Line 49, "a" should be deleted.

UNITED STATES PATENT AND TRADEMARK OFFICE
CERTIFICATE OF CORRECTION

PATENT NO. : 5,950,021

DATED : September 7, 1999

INVENTOR(S): RYOICHI SUZUKI, ET AL.

It is certified that error appears in the above-identified patent and that said Letters Patent is hereby corrected as shown below:

COLUMN 20:

Line 4, "slit" should read --slit plate--.
Line 6, "L1" should read --L1,--.
Line 29, "form" should read --from--.

COLUMN 22:

Line 9, "is" should be deleted.

Signed and Sealed this

Twenty-seventh Day of June, 2000

Attest:

Q. TODD DICKINSON

*Attesting Officer*  *Director of Patents and Trademarks*